US011327633B2

(12) United States Patent
Shah et al.

(10) Patent No.: US 11,327,633 B2
(45) Date of Patent: May 10, 2022

(54) HIGH-COGNITION RADIAL REPRESENTATION USER INTERFACE

(71) Applicant: Nutanix, Inc., San Jose, CA (US)

(72) Inventors: Rohan Pradip Shah, San Mateo, CA (US); Sheetanshu Bhardwaj, Santa Clara, CA (US)

(73) Assignee: Nutanix, Inc., San Jose, CA (US)

(*) Notice: Subject to any disclaimer, the term of this patent is extended or adjusted under 35 U.S.C. 154(b) by 0 days.

(21) Appl. No.: 16/947,443

(22) Filed: Jul. 31, 2020

(65) Prior Publication Data

US 2021/0271349 A1    Sep. 2, 2021

Related U.S. Application Data

(60) Provisional application No. 62/983,363, filed on Feb. 28, 2020.

(51) Int. Cl.
| | |
|---|---|
| *G06F 3/048* | (2013.01) |
| *G06F 3/0482* | (2013.01) |
| *G06F 3/04845* | (2022.01) |
| *H04L 67/1087* | (2022.01) |

(52) U.S. Cl.
CPC ........ *G06F 3/0482* (2013.01); *G06F 3/04845* (2013.01); *G06F 2203/04806* (2013.01); *H04L 67/1087* (2013.01)

(58) Field of Classification Search
CPC ........................... G06F 3/0482; G06F 3/04845
See application file for complete search history.

(56) References Cited

U.S. PATENT DOCUMENTS

| | | | |
|---|---|---|---|
| 8,185,824 B1 | 5/2012 | Mitchell et al. | |
| 8,224,942 B1 * | 7/2012 | Presotto | H04L 43/16 709/223 |
| 8,332,782 B1 | 12/2012 | Chang et al. | |
| 8,549,518 B1 | 10/2013 | Aron et al. | |

(Continued)

FOREIGN PATENT DOCUMENTS

WO    WO 2007079467 A2    7/2007

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Claudia Dragoescu
(74) *Attorney, Agent, or Firm* — Vista IP Law Group, LLP

(57) ABSTRACT

A first graphical depiction transitions into a second graphical depiction. Initially, a hierarchy of entities is presented as graphical elements that are distributed across concentric circular areas such that at least two of the graphical elements that correspond to sibling entities at a higher level of the hierarchy are presented in an inner circular area and such that at least one additional graphical element that corresponds to a lower level of the hierarchy is presented in an outer circular area. Responsive to an indication, the graphical elements of the inner circular area are rotated such that a selected one of the sibling entities at a higher level of the hierarchy is repositioned within the inner circular area and such that any unselected sibling entities of the higher level remain visible and selectable after being rotated.

24 Claims, 18 Drawing Sheets

(56) References Cited

U.S. PATENT DOCUMENTS

| | | | |
|---|---|---|---|
| 8,584,047 | B2 | 11/2013 | Athans et al. |
| 8,601,473 | B1 | 12/2013 | Aron et al. |
| 8,806,379 | B2 | 8/2014 | Chen et al. |
| 8,850,130 | B1 | 9/2014 | Aron et al. |
| 9,503,330 | B2 | 11/2016 | Zhang et al. |
| 9,772,866 | B1 | 9/2017 | Aron et al. |
| 2003/0023518 | A1* | 1/2003 | Spriggs .............. G06Q 10/087 705/28 |
| 2005/0081164 | A1* | 4/2005 | Hama .................. G06F 3/0482 715/830 |
| 2008/0022228 | A1* | 1/2008 | Kwon .................. G06F 3/0482 715/838 |
| 2009/0327921 | A1* | 12/2009 | Holm-Peterson ..... G06F 16/219 715/753 |
| 2011/0265023 | A1* | 10/2011 | Loomis ............... G06F 3/04812 715/771 |
| 2012/0151352 | A1* | 6/2012 | S. .......................... G06F 3/0482 715/734 |
| 2015/0378529 | A1 | 12/2015 | Ramanathan et al. |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Poitras, Steven. "The Nutanix Bible" (Jul. 9, 2019), from https://nutanixbible.com/ (Publication date based on indicated capture date by Archive.org; first publication date unknown).

Poitras, Steven. "The Nutanix Bible" (Feb. 3, 2020), from https://nutanixbible.com/ (Publication date based on indicated capture date by Archive.org; first publication date unknown).

Poitras, Steven. "The Nutanix Bible" (Aug. 1, 2020), from https://nutanixbible.com/ (Publication date based on indicated capture date by Archive.org; first publication date unknown).

Poitras, Steven. "The Nutanix Bible" (Jan. 30, 2021), from https://nutanixbible.com/ (Publication date based on indicated capture date by Archive.org; first publication date unknown).

Cano, I. et al., "Curator: Self-Managing Storage for Enterprise Clusters", *14th USENIX Symposium on Networked Systems Design and Implementation, NSDI '17,* (Mar. 27, 2017).

Guevara, G. A., "Modular Visualization of Distributed Systems", CLEI Electronic Journal, CLEIej vol. 14 No. 1, (Revised on Mar. 31, 2011).

Liu, M. et al., "Fine-Grained Replicated State Machines for a Cluster Storage System", *17th USENIX Symposium on Networked Systems Design and Implementation (NSDI '20),* (Feb. 25-27, 2020).

\* cited by examiner

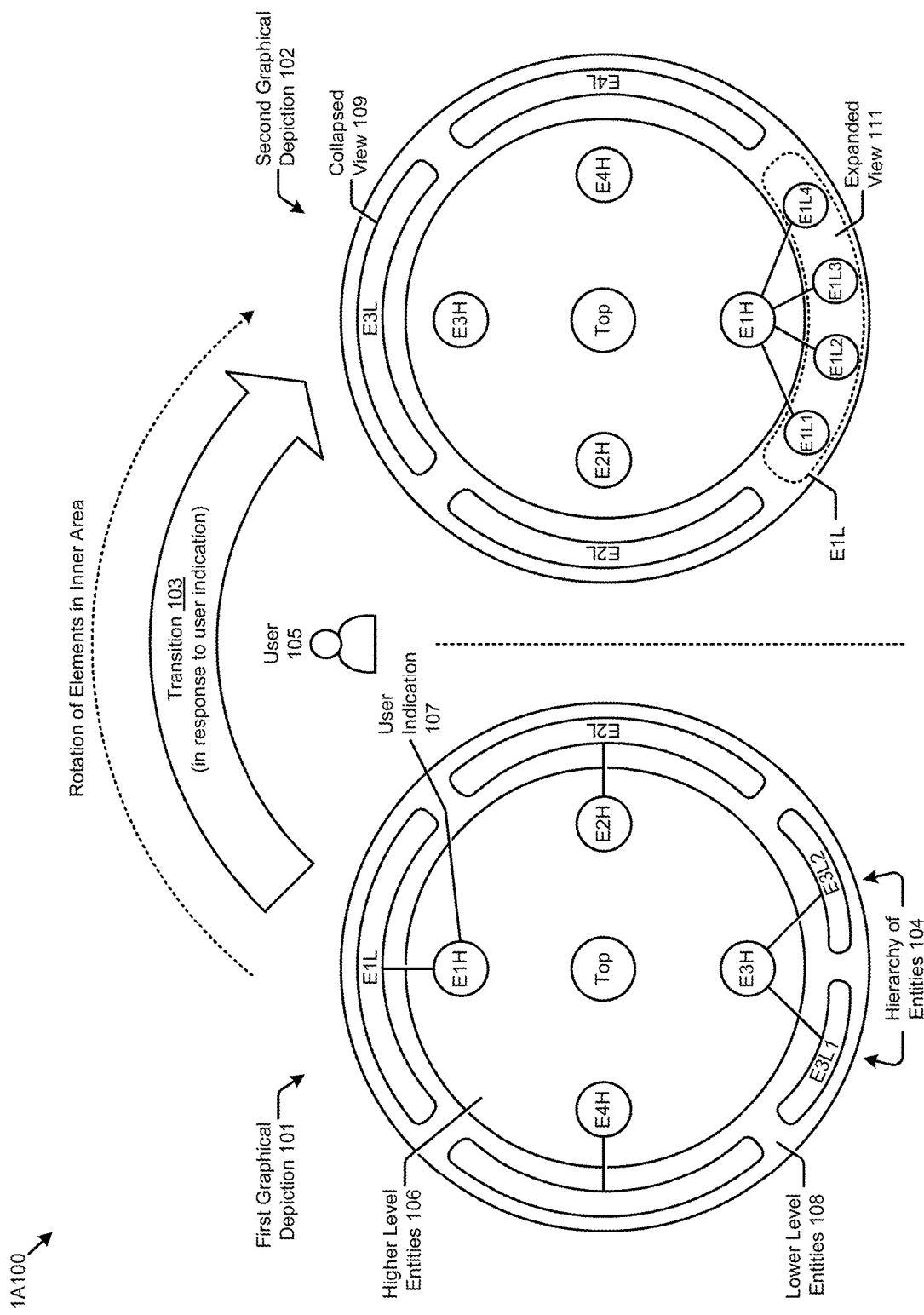
FIG. 1A1

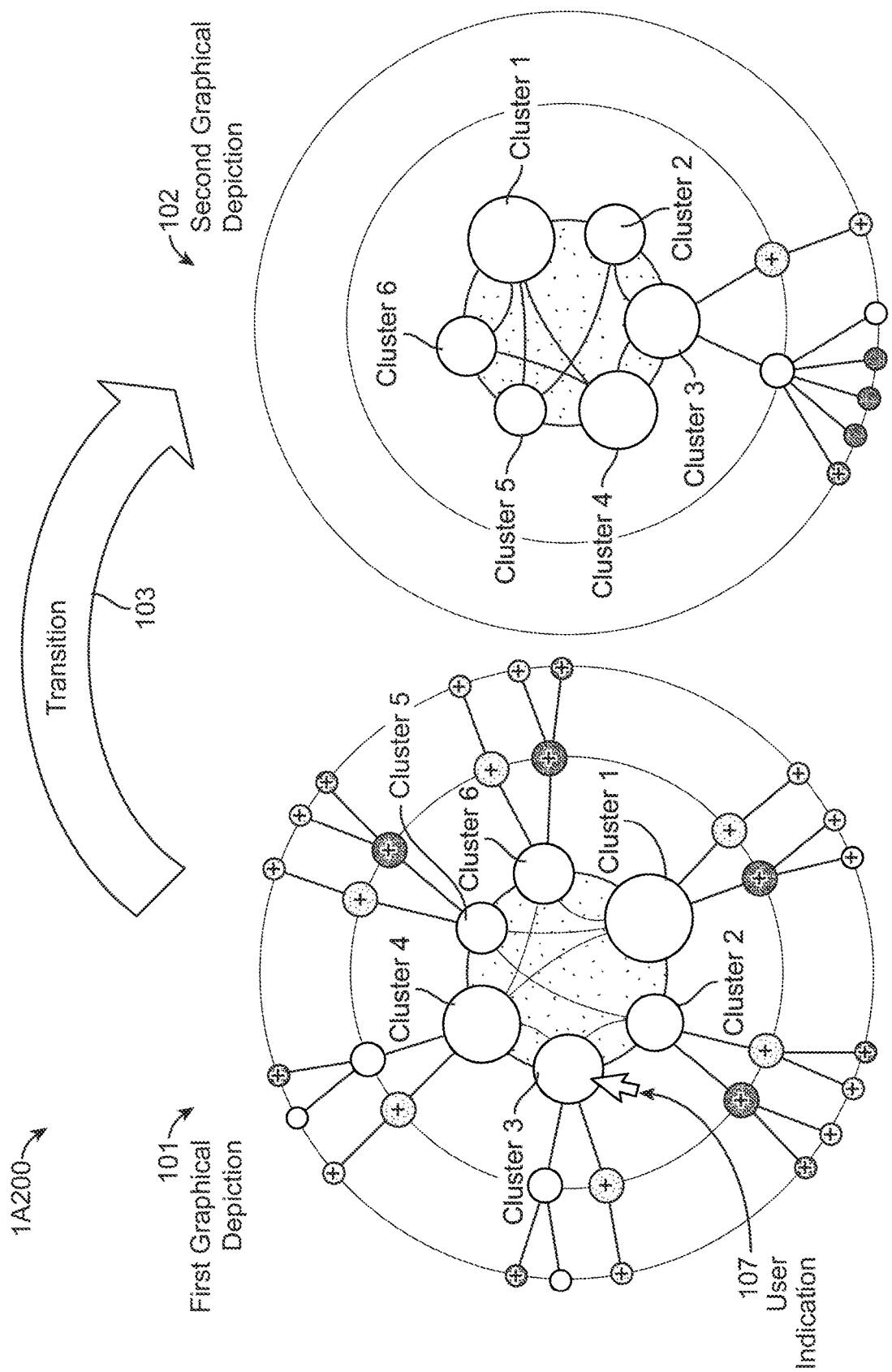

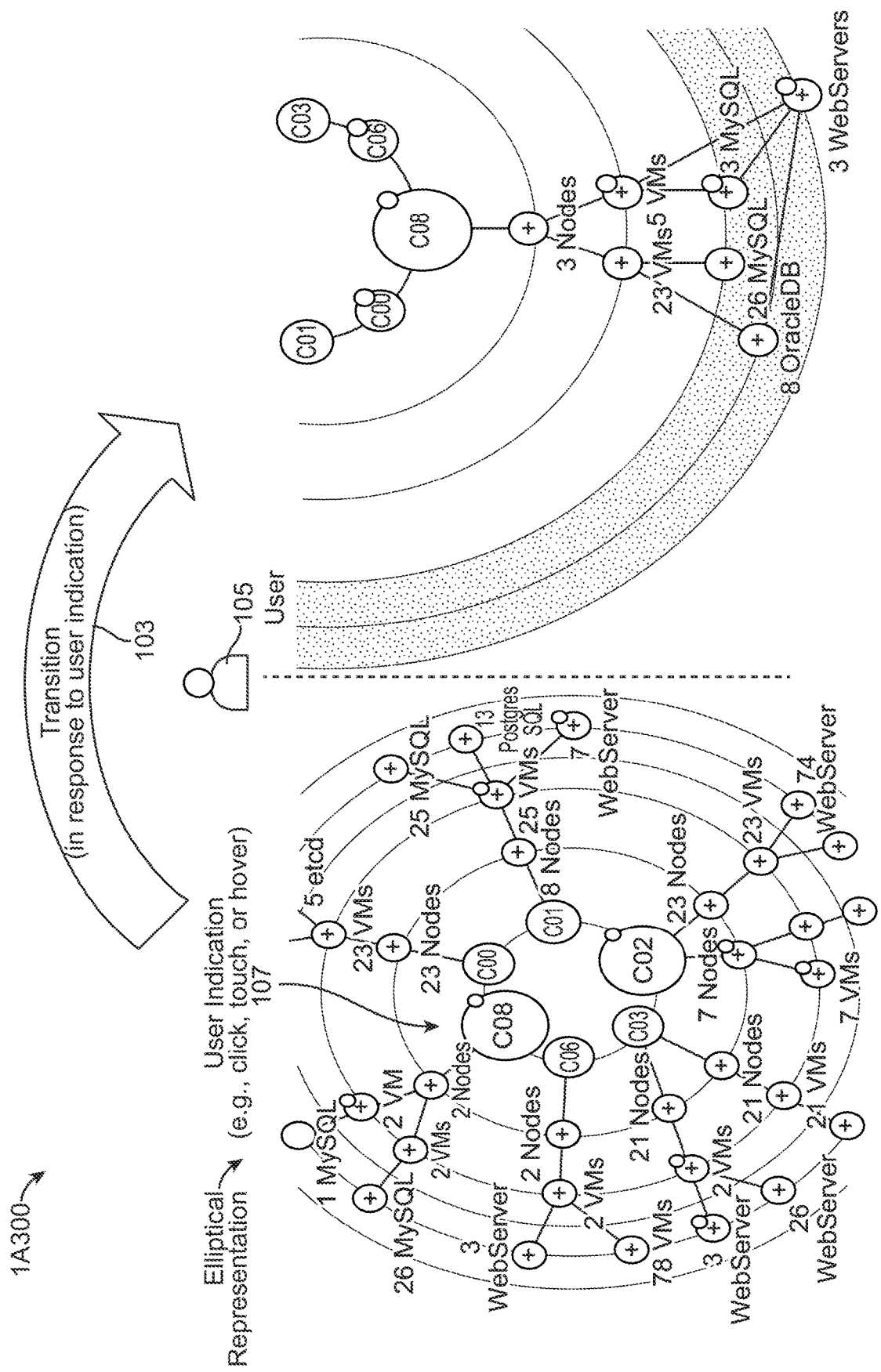
FIG. 1A3

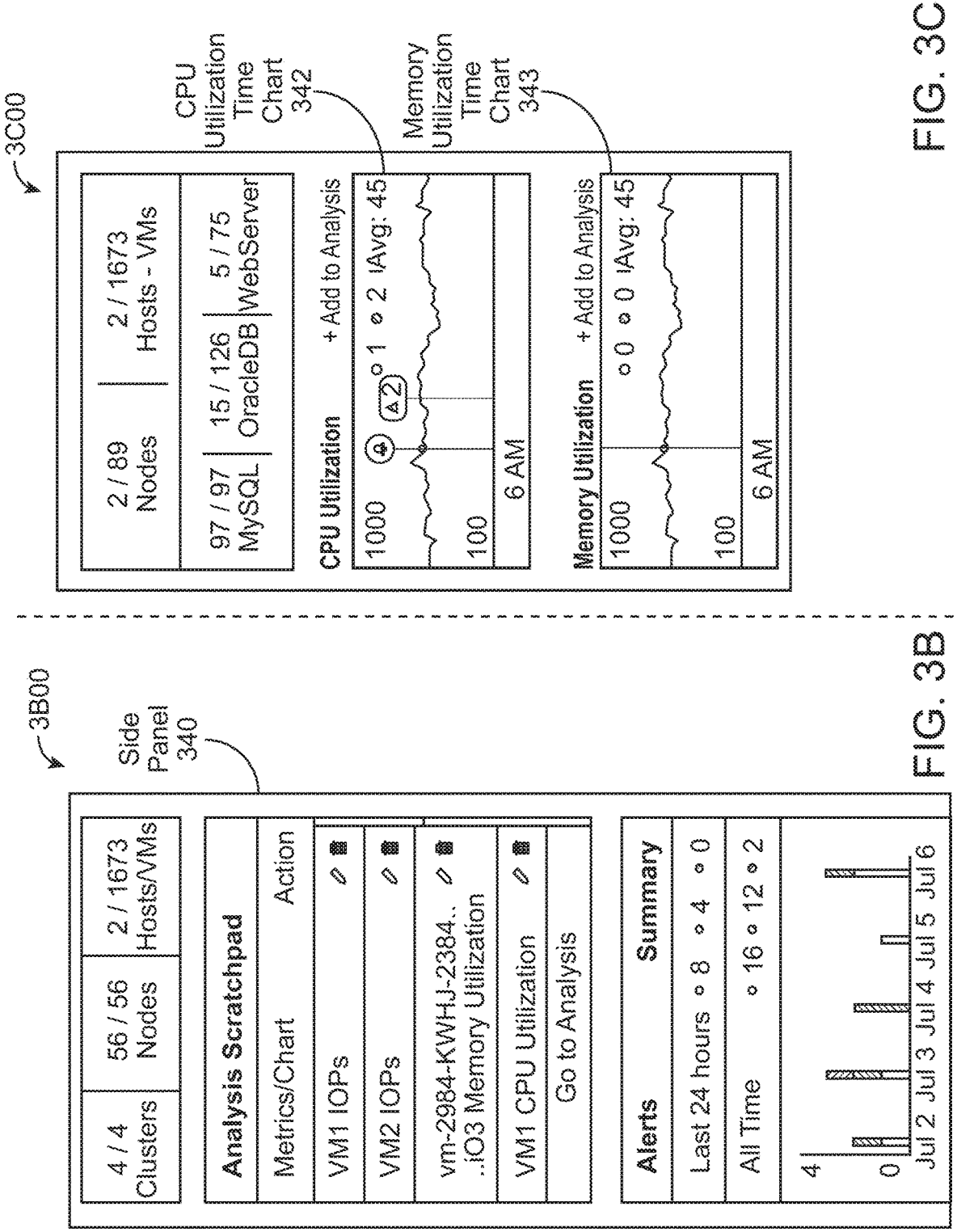

HIGH-COGNITION RADIAL REPRESENTATION USER INTERFACE

CROSS REFERENCE TO RELATED APPLICATIONS

The present application claims the benefit of priority to U.S. Patent Application Ser. No. 62/983,363 titled "HIGH-COGNITION RADIAL REPRESENTATION USER INTERFACE", filed on Feb. 28, 2020, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

This disclosure relates to computer system management, and more particularly to techniques for implementing A radial representation user interface.

BACKGROUND

Modern day data centers are complex systems, spanning logical clusters, physical nodes, virtual machines, and application software. These entity types are structured into a hierarchy based on relationships and dependencies that become more and more complicated with the size of the data center. In addition to the complication of these dependencies, an additional complication is the sheer number of entities in each of these hierarchical layers. Nevertheless, in order to maintain the data center in a healthy state, IT administrators need to be able to understand what is going on with these data center entities.

Unfortunately, the foregoing complexities make it difficult or impossible for a human to comprehend the structure of these complex systems, much less to comprehend the dependencies. What is needed is a way to present views of these complex systems in a manner that facilitates understanding of what is going on with the data center entities. Moreover, what is needed is a technique or techniques that address the cognitive difficulties encountered by a user when presented with a graphical user interface that represents complex relationships between a large number of interrelated computing entities.

SUMMARY

This summary is provided to introduce a selection of concepts that are further described below. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for implementing radial representation user interfaces Various embodiments are implemented in systems, methods, and in computer program products for providing a radial representation user interface. The disclosed techniques advance the relevant technologies to address technological issues with legacy approaches. Certain embodiments are directed to technological solutions for presenting hierarchical and other relationships between computing entities in a concentric band graphical user interface.

The disclosed embodiments modify and improve over legacy approaches. In particular, the herein-disclosed techniques provide technical solutions that address the technical problems attendant to addressing the difficulty of presenting graphical user interfaces to represent complex relationships between computing entities. Such technical solutions involve specific implementations (e.g., graphical user interfaces, graphical user interface transitions, data organization, data communication paths, module-to-module interrelationships, etc.) that relate to the software arts for improving computer functionality.

Many of the herein-disclosed embodiments for presenting hierarchical and other relationships between computing entities in a user interface introduce technological solutions pertaining to technological problems that arise in the hardware and software arts that underlie computing systems. Aspects of the present disclosure achieve performance and other improvements in peripheral technical fields including, but not limited to, hyperconverged computing platform management and graphical user interfaces.

Further details of aspects, objectives and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure. This patent or application file contains at least one drawing executed in color. Copies of this patent or patent application publication with color drawings will be provided by the U.S. Patent and Trademark Office upon request and payment of the necessary fee.

FIG. 1A1 depicts a first example state transition for implementing state changes in a radial representation user interface, according to an embodiment.

FIG. 1A2 depicts a second example state transition for implementing state changes in a radial representation user interface, according to an embodiment.

FIG. 1A3 depicts an example state transition for implementing state changes in a radial representation user interface, according to an embodiment.

FIG. 3B depicts an example of an attribute summary sidebar representation as used in a computer-implemented user interface, according to an embodiment.

FIG. 3C depicts an example of an attribute time chart sidebar representation as used in a computer-implemented user interface, according to an embodiment.

DETAILED DESCRIPTION

Figure 1B:
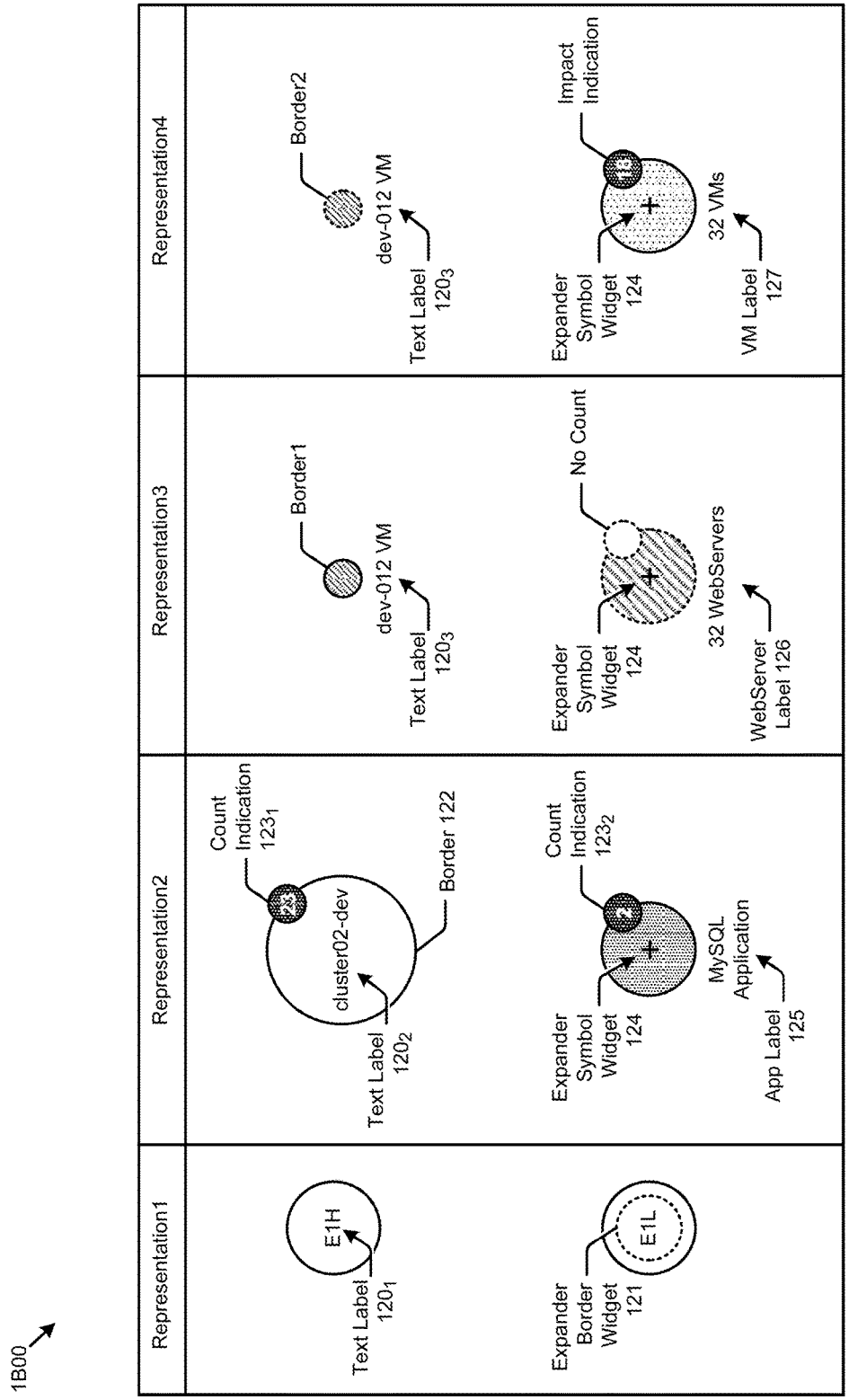
FIG. 1B depicts example graphical representations as used in systems that manage state changes in a radial representation user interface in a computer-implemented user interface, according to an embodiment.

Aspects of the present disclosure solve problems associated with using computer systems to address the difficulty of forming and transitioning graphical user interfaces to represent complex relationships between computing entities. These problems are unique to, and may have been created by, various computer-implemented methods that present relationships among components of computing systems. Some embodiments are directed to approaches for presenting hierarchical and other relationships between computing entities in a concentric band graphical user interface. The accompanying figures and discussions herein present example environments, systems, methods, and computer program products for presenting state changes in a radial representation user interface.

Overview

Using the herein-disclosed techniques, information technology (IT) professionals can avail themselves of: (1) a single view representing all entities; (2) a single view that depicts the hierarchical relationships between the entities; (3) a single view which, a glance, can help the IT professional understand the state of the system; and (4) a view or views that help the IT professional understand how the state of the system is changing over time.

Disclosed herein are visualizations that depict all of the infrastructure entities in data centers (e.g., physical or virtual) as well as all of the software applications that are running on that infrastructure. The visualizations stem from a single view, wherein the state of each entity is represented using visually-discernable indications. The hierarchy and other relationships between any two or more entities are displayed using links. The visualizations as shown in the figures and as discussed herein facilitate invocation of zoom-in actions (e.g., zoom in to a selected entity such as a selected cluster). Such zoom-in actions sometimes include transitions that expand a view to show selected entities and/or collapse a view to hide non-selected entities. Both the expanded views and the collapsed views offer sufficient context for navigation to other selected entities (e.g., other clusters).

As used herein, a data center comprises one or more logical clusters, any of which comprise one or more physical nodes. A physical node can host any number of virtual machines (VMs) and any number of software applications that run on the VMs.

Hierarchical Relationships

A logical cluster, and/or a physical node, and/or a virtual machine, and/or an application may have hierarchical relationship as follows:

Clusters→Nodes→VMs→Applications

Specifically, and as may be depicted in the figures, a cluster contains one or more physical nodes, where a physical node contains one or more VMs, and a VM contains applications.

As discussed herein, individual instances of a particular entity type (e.g., a cluster, a node, a VM, an application) are termed as individual entities. Any one or more individual entities that share at least one relationship among themselves, or that share a relationship to a hierarchically higher-level entity, are termed sibling entities. Sibling entities can be grouped together based on certain specific characteristics. For example, all sibling VMs that have critical alerts might be grouped together.

Relationships can be based on the hierarchy and/or population of individual entities. As examples, (1) nodes that are part of a cluster are deemed to be related to that cluster, (2) virtual machines that are part of a node are deemed to be related to that node, and (3) applications that are running on a virtual machine are deemed to be related to that virtual machine.

Initial State Presentation: Data Center Visualization

An initial state comprises a grid of concentric concave areas. As shown in FIG. 1A1, the entities are laid out on a circular grid having concentric concave areas where each different concave area contains entities of a specific entity type. The sequence of concave areas from inside to outside represent the hierarchical relationship between entity types. In the example shown, the innermost concave area contains graphical representations of cluster entities. The next concave area contains graphical representations of node entities, the next concave area after that contains graphical representations of virtual machines, and the next concave area after that contains graphical representations of application entities.

Entity Representation

Individual entities are visually represented using visually-discernable graphical representations, examples of which are depicted in FIG. 1A2 and FIG. 1A3. In some embodiments, the visually-discernable graphical representations include circles. The states of nodes, states of VMs, and states of application entities can be encoded using the fill color or fill shading of the graphical representations, and/or using the fill pattern or color of the border of the graphical representations. This is shown in FIG. 1B. Individual entities can be decorated by additional graphical representations (e.g., smaller circles) that represent the cardinality of some aggregated state. Graphical representations that are not filled with any color or pattern represent individual entities. The presence or absence of a fill color or fill pattern can be used to visually differentiate the graphical representation of an individual entity from the graphical representation of a grouped entity. Specifically, graphical representations that do not have a fill color or fill pattern represent an individual entity, whereas graphical representations that do have a fill color or fill pattern represent a grouped entity.

In example embodiments, such as are shown in the figures, multiple sibling entities that are grouped together are represented as a single circle with a plus sign (i.e., a '+' sign). The '+' sign serves as a visual cue that there are multiple entities being represented by a single circular image.

Hierarchical and Other Relationships

A relationship between any two entities or grouped entities across the grid is represented by a line connecting the corresponding entity circles. Any of the foregoing graphical representations can be combined in a manner that aids human cognition. For example, complex hierarchical representations can be visually represented in a single view even at large scale. e.g., a circular layout of the grid can be extended to include additional bands of concentric concave areas. Entity-to-entity relationships can be visually represented using connected lines (e.g., even at the data center level view). Graphical representations of entities can be decorated to represent aggregations (e.g., aggregations of alerts). Entities can be visually grouped based on a particular shared state.

Transition from Initial State to Target State

On demand by a user, a representation of the underlying system in an initial state can be transitioned to a target state. One such example is presented in FIG. 1A3. In this example, if a user interacts (e.g., clicks on or double clicks) any cluster entity, the following animations are invoked: (1) the innermost circular area rotates in clockwise direction until the selected cluster is at the bottom of the innermost circular area, (2) the radius of circles representing non-selected cluster entities reduces to half of their original sizes, (3) the innermost circle moves up towards the top of the visualization along with its sub-entities, (4) the sub-entities of non-selected clusters collapses into a cluster widget, and (5) grouped sub-entities of the selected cluster are broken down into the constituent individual entities represented by other widgets. Any one or more of the foregoing state transitions can be further animated for smooth motion and to aid in cognition of what is taking place during the transition. Examples of animation (e.g., visibly displaying results of successive acts of rotation) include: (1) the innermost circular area rotates with a smooth animation, (2) the top portion of the circular grid is faded out or hidden while performing the zoom-in transition in the bottom portion, (3) selected entities are expanded to show hierarchically-lower entities, and (4) unselected entities are collapsed while performing the zoom-in transition.

As used herein to "rotate" or to "rotate the graphical elements" means to reposition elements around the center of a curve. The curve can be a circle, or an ellipse or any other curve or portion of a curve. When repositioning two or more graphical elements around the center of a curve the two or more graphical elements remain in the same relative position with respect to each other while they are being repositioned around the center of the curve.

Target State Presentation after Transition: Cluster Visualization (Zoom in to a Single Cluster)

All of the entities are still presented in the same grid of concentric concave areas. The bottom portion of the grid is visible and is expanded to accommodate individual entities. The upper part of the grid is temporarily hidden (e.g., scrolled away) to occlude unselected clusters. The temporarily occluded portion can be accessed through use of a vertical scroll control.

In the target state, the selected cluster is represented by a relatively larger cluster widget. The unselected cluster entities are represented by relatively smaller cluster widgets. Any one of the individual entities of any entity group can be accessed by clicking or hovering over a widget with a '+' indication, at which point in time the underlying entities are displayed as a pop-up. Any aspects of the foregoing can be combined. Strictly as examples, one or more of the following may be operable during presentation in the target state: (1) a single view representing all the entities of a cluster is laid out in hierarchical layers; (2) a 'gun barrel' is presented for navigation to other clusters; (3) upon clicking any collapsed cluster, the innermost concave area rotates in place and the clicked cluster is expanded; (4) upon clicking any collapsed cluster, the innermost concave area rotates and the unclicked clusters are collapsed; (5) an in-place pop-up is presented, which pop-up serves to represent expansion of grouped entities; (6) upon clicking any grouped entity circle, a pop-up layout is displayed to show all the constituent individual entities; and (7) upon clicking any individual entity, a panel appears (e.g., juxtaposed on the left or right portion or top or bottom portion), which panel displays the relevant metrics of the selected individual entity.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A1 depicts a first example state transition 1A100. As an option, one or more variations of the state transition or any aspect thereof may be implemented in the context of the architecture and functionality of the embodiments described herein. The state transition or any aspect thereof may be implemented in any environment.

The transition commences when a user indicates a particular graphical element in the first graphical depiction 101. The figure shows how a first graphical depiction 101 is organized to allow user selection of an element of the first graphical depiction 101, and further, the figure shows how the first graphical depiction undergoes a transition 103 to a second graphical depiction 102 that includes only a portion of the elements of the first graphical depiction 101. The figure also shows that only some of the elements of the first graphical depiction 101 are displayed in the second graphical depiction 102. Specifically, only some of the hierarchy of entities 104 of the first graphical depiction 101 are displayed in the second graphical depiction 102. Still more specifically, many of the hierarchically-lower elements of the non-selected element do not appear in the second graphical depiction 102.

The second graphical depiction 102 of FIG. 1A1 is depicted as including a circular shape, however this is merely one example embodiment. Strictly as additional examples, the second graphical depiction 102 might depict only a semi-circular portion shown hierarchical relationships between the elements (e.g., relationships between the higher level entities 106 and corresponding lower level entities 108), and/or might include different shapes and/or decorations, and/or might include different shapes of guidelines, bands, etc.

When transitioning from the first graphical depiction 101 to the second graphical depiction 102, (e.g., responsive to an indication by a user 105) the elements depicted in the center of the first graphical depiction 101 might be rotated during the transition (e.g., referring to the previously mentioned 'gun barrel'). For example, a user's selection of an element at the top of the first interface might cause rotation of all of the elements in the center of the first interface such that just the selected one is depicted in the second graphical depiction 102.

In some embodiments, in addition to the foregoing rotation, the hierarchy of the entity corresponding to a particular user indication 107 is exploded to form an expanded view 111, whereas any sibling hierarchies are imploded to form a collapsed view 109.

The foregoing graphical depiction 101, graphical depiction 102 and the transition 103 can be applied to any system having hierarchical and sibling relationships between entities. In some settings, the system having hierarchical and sibling relationships is a system of computing clusters, which computing clusters form one or more data centers. A system of computing clusters and corresponding techniques for transitioning between a first graphical depiction of the computing clusters and a second graphical depiction of the computing clusters is shown and discussed as pertains to FIG. 1A2.

FIG. 1A2 depicts a second example state transition 1A200 for implementing radial representation state changes. As an option, one or more variations of state transition 1A200 or any aspect thereof may be implemented in the context of the architecture and functionality of the embodiments described herein. The state transition 1A200 or any aspect thereof may be implemented in any environment.

More specifically, and as shown, the first graphical depiction 101 is populated (e.g., bubbled-out) with multiple levels of each hierarchy corresponding to a computing cluster. Upon occurrence of user indication 107 (e.g., positioning of a cursor, clicking, double-clicking, etc.) the transition 103 to second graphical depiction 102 is initiated. In this example, the entity labeled as "Cluster 3" is exploded or expanded, whereas all of the hierarchies of siblings to "Cluster 3" are imploded or collapsed. During the transition, the gun-barrel rotation is carried out such that the selected entity "Cluster 3" is positioned at the bottom portion of second graphical depiction 102. The unselected entities remain visible. The unselected entities are selectable via a user interaction over the graphical elements that are visible in the second graphical depiction 102.

The specific shapes and colors and juxtaposition of entities, and/or the specific shapes and colors that are presented during transition 103 may vary without departing from the scope of the disclosure. One embodiment having an alternative set of shapes and colors and juxtaposition of entities is shown and described as pertains to FIG. 1A3.

FIG. 1A3 depicts an example state transition 1A300 for implementing radial representation state changes. As an option, one or more variations of state transition 1A300 or any aspect thereof may be implemented in the context of the architecture and functionality of the embodiments described herein. The state transition 1A300 or any aspect thereof may be implemented in any environment.

In the embodiment shown, an elliptical shape defines the boundary of the first graphical depiction. Furthermore, only a portion of the elliptical shape is presented in the second graphical depiction. As shown, even though only a portion of the elliptical shape is presented in the second graphical depiction, all of the sibling clusters remain visible, thus accommodating high-cognition.

FIG. 1B depicts example graphical representations 1B00 as used in systems that manage radial representation state changes in a computer-implemented user interface. As an option, one or more variations of graphical representations 1B00 or any aspect thereof may be implemented in the context of the architecture and functionality of the embodiments described herein. The graphical representations 1B00 or any aspect thereof may be implemented in any environment.

The graphical representations (e.g., representation1, representation2, representation3, representation4) are presented merely for illustrative purposes. Other graphical representations are possible. More specifically, though the graphical representations of FIG. 1B are a two-dimensional drawings (i.e., reproducible on a paper sheet) and are static (i.e., are not moving), there are many possible graphical representations that are three-dimensional or apparently three-dimensional (e.g., as a hologram), and/or there are many possible graphical representations that change (e.g., change colors) or move (e.g., vibrate, bounce, etc.).

As shown, the graphical representations under representation1 serve to represent an entity or a group of entities. An entity under representation1 might have a text label $120_1$ that is positioned inside the graphical element border. Further, an entity under representation1 might have an expander (e.g., expander border widget 121) positioned inside in such a manner that it can be subjected to user interaction. In some of the examples discussed herein, a user clicks on a clickable expander, which causes the representation of the entity or a group of entities to be expanded to a next level. In some cases, expanding to a next level means to expand into a graphical representation of all siblings. In some cases, expanding to a next level means to expand into a graphical representation of lower levels of a hierarchy.

As shown, the graphical representations under representation2 include widgets that can be subjected to user interaction (e.g., are clickable). In one particular example, a count widget (e.g., count indication $123_1$, count indication $123_2$) serves to indicate a number that applies to an attribute of the entity to which the count widget is attached. In the example shown, the count widget is bisected by border 122, however the count widget could be positioned elsewhere, possibly fully inside the border 122 or possibly fully outside of the border 122. Additionally, the graphical representations under representation2 include an expander symbol (e.g., the "+" sign symbol of expander 124) that can be subjected to user interactions such that a user click on the expander symbol causes the representation of the corresponding entity or a group of entities to be expanded to a next level. Any entity can be multiply-labeled. For example, an entity can have a first label (e.g., text label $120_2$) that is positioned within or near a 'bubble', and as shown in representation3 and representation4, an entity can have both a first label and a second label (e.g., text label $120_3$, app label 125, webserver label 126, VM label 127, etc.) that are also positioned within or near a 'bubble'.

As depicted by the widgets of representation3 and representation4, a graphical representation of an entity can be sized, shaded, colored, and otherwise decorated in accordance with corresponding then-current values of various parameters. For example, the bubble corresponding to "dev-012 VM" is shown under representation3 and representation4, is the same in some respects (e.g., radius size and text label) and different in other respects (e.g., shading, color and appearance of a border2 that is different from border1).

Furthermore, and as depicted by the widgets of representation3 and representation4, a graphical representation of an entity can be annotated in accordance with corresponding then-current values of various parameters. For example, although the bubble corresponding to "32 Web Servers" under representation3 is the same size as the bubble corresponding to "32 VMs" under representation4, and although the bubble corresponding to "32 WebServers" under representation3 uses the same "+" symbol expander is the same symbol expander as is used in the bubble corresponding to "32 VMs" under representation4, the bubbles are annotated differently to show various then-current values of parameters. In this case, the bubble corresponding to "32 WebServers" under representation3 is decorated with a "No Count" indication, whereas the bubble corresponding to "32 VMs" under representation4 is decorated with a contrasting/highlighting color or fill (as shown) as well as an "Impact Indication".

Any of the foregoing widgets and/or decorations and/or annotations can be combined into any graphical depictions and, furthermore, any of the foregoing widgets and/or decorations and/or annotations can be conditionally presented (e.g., hidden, shown, transparent, opaque) during any transition from an initial state to a target state.

Figure 2A:
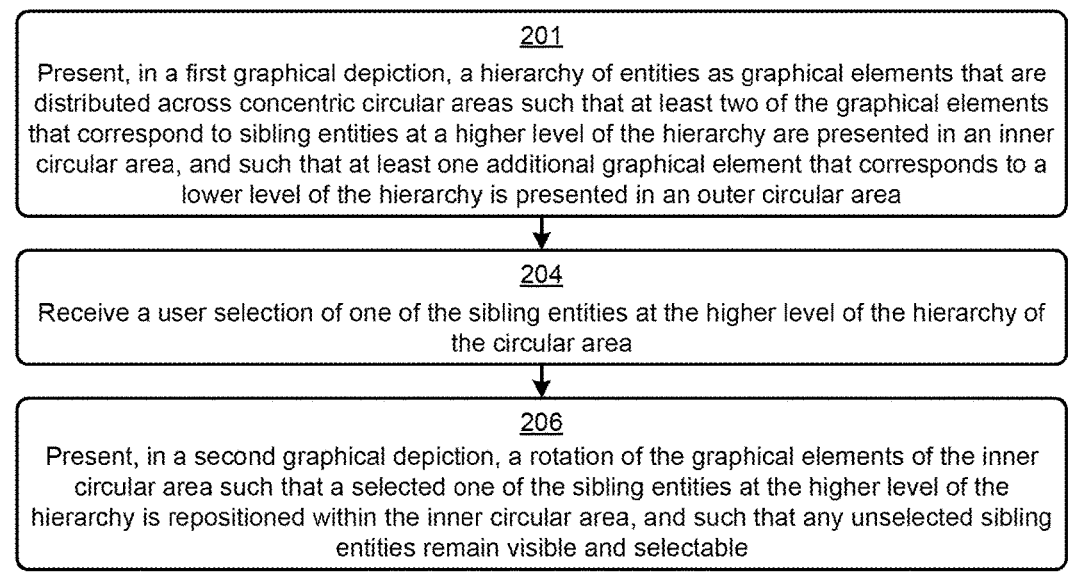
FIG. 2A depicts an example flow of operations as used in systems that manage state changes in a computer-implemented user interface, according to an embodiment.

One particular example of a transition from an initial state to a target state is discussed as pertains to FIG. 2A. A state chart showing a logical representation of a state machine to carry out a transition from an initial state to a target state is discussed as pertains to FIG. 2B. A system that processes data used in the presentation of an initial state as well as in transitioning from an initial state to a target state is discussed as pertains to FIG. 2C. A means of collecting data that is used in the presentation of an initial state as well as while transitioning from an initial state to a target state is discussed as pertains to FIG. 2D, and an alternative example of a transition from an initial state to a target state is discussed as pertains to FIG. 2E.

FIG. 2A depicts an example flow 2A00 of operations as used in systems that manage radial representation state changes in a computer-implemented user interface.

As shown, the flow causes a transition from an initial state to a target state. The initial state is displayed (step 201) as a first graphical depiction. In this first graphical depiction, a hierarchy of entities are presented as graphical elements that are distributed across concentric circular areas such that at least two of the graphical elements that correspond to sibling entities at a higher level of the hierarchy are presented in an inner circular area such that at least one additional graphical element that corresponds to a lower level of the hierarchy is presented in an outer circular area.

Upon receiving a user indication of a selected of one of the sibling entities (step 204), a transition to a target state is commenced. The target state is transitioned to by rotating (step 206) the graphical elements of the inner circular area such that a selected one of the sibling entities at a higher level of the hierarchy is repositioned within the inner circular area such that any unselected sibling entities remain visible and selectable. This technique for transitioning such that the graphical elements of the inner circular area remain visible, helps the user to keep track of the siblings. Furthermore, this technique for transitioning such that the graphical elements of the inner circular area remain selectable permits the user to move freely through the hierarchy without getting lost since the siblings move in a manner that is easily tracked by the user.

Figure 2B:
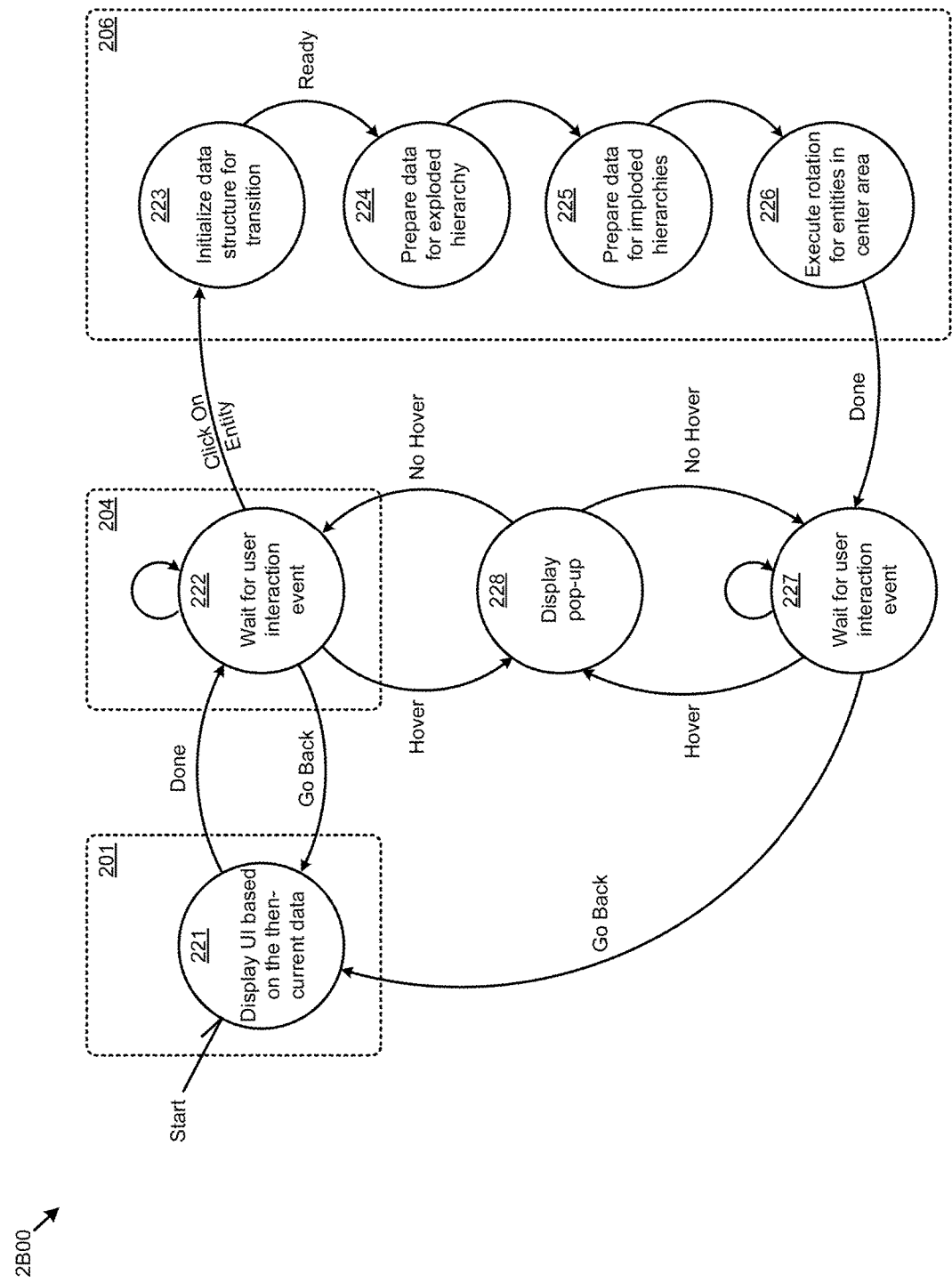
FIG. 2B is a state chart depicting operational state transitions that are implemented in state machines that are in turn used in systems that manage state changes of a computer-implemented user interface, according to an embodiment.

FIG. 2B is a state chart 2B00 depicting operational state transitions that are implemented state machines that are in turn used in systems that manage state changes of a computer-implemented user interface.

The state chart depicts states and state transitions that may occur as a user interacts with the user interface. Specifically, the state chart illustrates a projection of step 201, step 204, and step 206 onto the state chart. The shown series of state transitions starts at state 221, which state is representative of any amount of time that the initial UI is initially populated with then-current data pertaining to a hierarchy of elements. At some point the initial population or bubble-out of the user interface is complete, and the state machine transitions to state 222 to wait for a user interaction event. In this particular implementation, it is shown that the user clicks on an entity, however other types of user interaction with the computer are possible. For example, rather than a click, sensing a "hover" interaction or sensing a "touch" interaction can be used to move the state machine into state 223.

In exemplary implementations, the transition from an initial state to a target state includes many changes on the screen. As such, rather than merely repaint a target state graphical depiction (e.g., in a one frame transition), an ordered series of images are displayed approximating a movie of one second or perhaps a few seconds in duration. This helps the user to remain situated in the hierarchy even though there are many entities that move on the screen. Accordingly, the state machine proceeds from state 223 to initialize a data structure to prepare data that corresponds to a visual depiction of an exploded hierarchy of the selected sibling (state 224) and then to initialize a data structure to prepare data that corresponds to any number of imploded hierarchies (state 225). When all of the data needed for display of the target states of both the exploded hierarchy of the selected sibling as well as for display of the target states of the imploded hierarchies of the unselected siblings, then the movie can commence by entering state 226.

By presenting a series of images rapidly in a sequence (e.g., 15 frames per second, 30 frames per second, etc.), thus approximating a movie of a second or longer in duration, the rotation of the entities of the center area can be followed by the visual cognition of the user (state 227). Stated differently, the user is taken through a visually-discernible transition from the initial state to the target state and, during this transition, the user can see changes as they occur.

Once the target state has been reached, the user is again free to interact with the user interface. In some cases, and as shown, a user might "hover" over a display element, and if the duration of the hover is sufficiently long (e.g., 500 milliseconds or so) the state machine will enter state 228 that serves to display one or more variations of a pop-up display.

In some embodiments, certain user events (e.g., keypress of a CTRL-z) indicate an immediate return to the initial state. This is shown by the state machine transition from state 227 to state 221 (e.g., which state machine transition is responsive to go back indication).

Figure 2C:
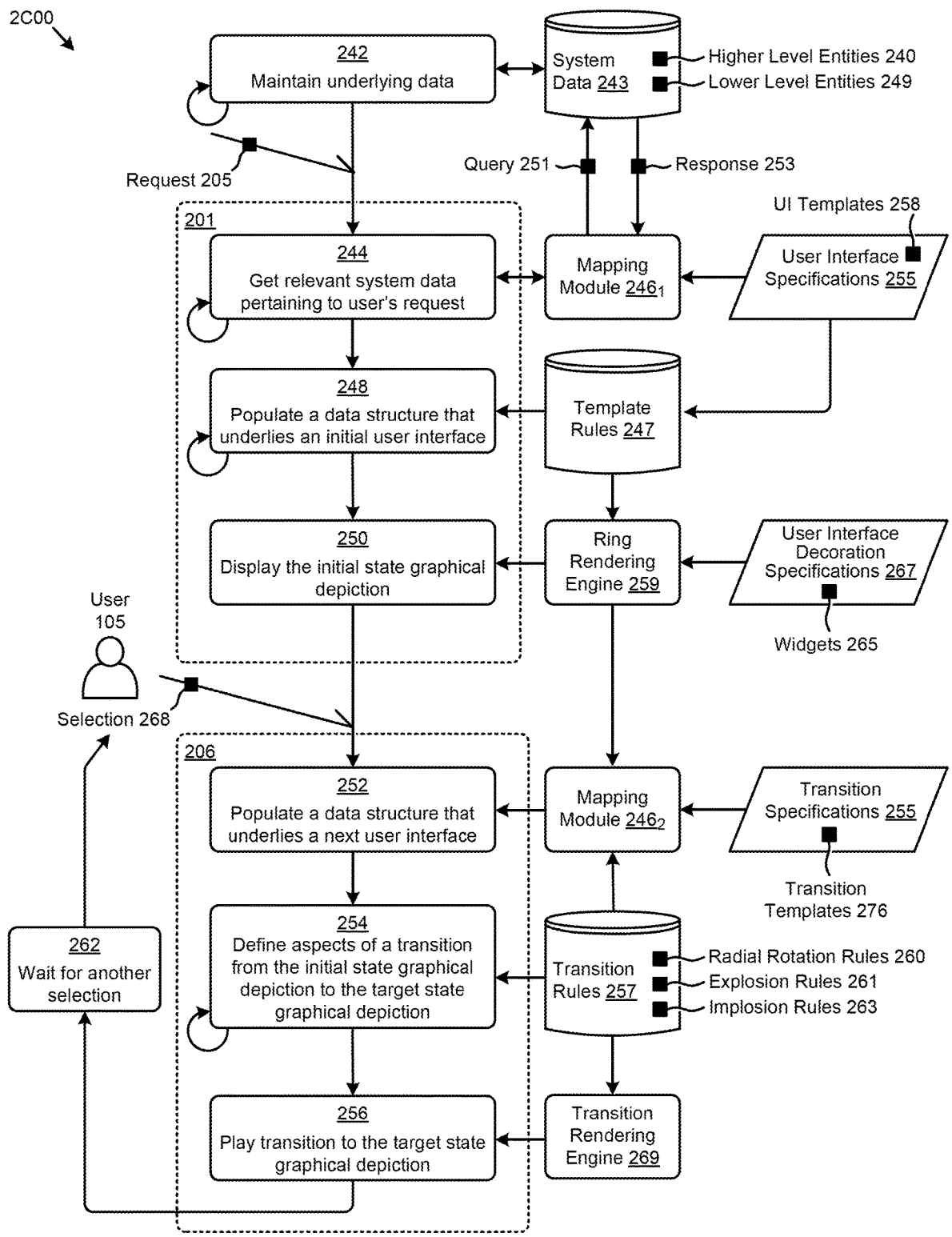
FIG. 2C depicts an example rendering system for managing state changes of a computer-implemented user interface, according to an embodiment.

FIG. 2C depicts an example rendering system 2C00 for managing state changes of a computer-implemented user interface. The flow is being presented to show how data from an underlying system (e.g., a virtualization system) can be continually gathered, stored and then read at any moment in time so as to present a graphical representation of the underlying system. Furthermore, the flow is being presented to show operations that are carried out when transitioning from an initial graphical depiction of a system to a second graphical depiction of the system.

The example system includes an ongoing step 242. Specifically, step 242 executes continually and, in doing so, system data 243 is gathered and stored. As shown, system data 243 includes data gathered from the topology of a hierarchy (e.g., the topology of a computing cluster), and entities that make up the hierarchy are tagged with labels to indicate their position in the hierarchy. In the example shown in FIG. 2C, the entities of the hierarchy are tagged as higher level entities 240 and lower level entities 249. System data is stored and maintained in a manner that supports forming a response 253 to a query 251.

Several of the operational elements as shown in FIG. 2C operate cooperatively to initially populate the user interface to an initial state. In this particular system configuration, the initial bubble-out of the initial state of the user interface is carried out by receiving a request 205 (e.g., a user request raised by user interaction with the user interface). The nature of the request is then analyzed (e.g., via mapping module 246₁), at least to the point that a query 251 can be made to access system data. A response 253 is returned, and the contents of the response is used in conjunction with user interface specifications 255 and mapping module 246₁ in order to populate a data structure, which data structure in is turn used in conjunction with a ring rendering engine 259 to bubble-out an initial display.

The foregoing modules (e.g., mapping module 246₁, ring rendering engine 259) and their data inputs (e.g., user interface specifications 255, UI templates 258, user interface decoration specifications 267, template rules 247, and widgets 265) support the shown operations to get relevant data (step 244) to populate a data structure (step 248) and to display an initial state of a user interface (step 250). Once the characteristics of a bubble-out and initial display are known, then, and as shown, step 244, step 248, and step 250 are carried out.

In this and other embodiments, the mapping module 246₁ is configured to receive a request 205 (e.g., in the form of a user interface event) and convert that request into a corresponding query. Strictly as an example, the request 205 might carry the semantics of, "Show me my data center," and the query might carry the semantics of, "Get configuration data for all clusters of the data center," and/or "Get virtual machine information for all nodes of the clusters," and/or "Get application information for all of the virtual machines of the nodes," and/or "Get product information for all nodes of the clusters," and/or "Get database instance information for all nodes of the clusters," etc. In aggregate, the response or responses to one or more queries is sufficient to populate an underlying data structure such that the ring rendering engine 259 can map elements of different, successively lower levels of hierarchy onto different, successively farther out rings of the user interface.

Once the initial user interface is displayed, user 105 is able to interact with the inner circular area and the concentric rings of the display. As shown, the user can select one of a plurality of sibling entities that had been bubbled-out during performance of step 250. Once selected, next steps for rotating the graphical elements of the inner circular area such that the selected sibling entities at a higher level of the hierarchy are repositioned within the inner circular area can be carried out. As previously discussed, high-cognition is facilitated by presenting a smooth transition from the initial state graphical depiction to the target state graphical depiction via a series of frames that constitute a movie of a second or a couple of seconds in duration.

To accomplish a visibly smooth transition from the initial state to the determined target state, a data structure with display data is populated. A mapping module 246₂, together with transition specifications 255 and any number of transition templates 276 might be employed to populate said data structure with at least the data to be displayed in the desired target state. The transition specifications 255 and any number of transition templates 276 might include specific aesthetically pleasing transitions from an initial graphical representation to any final graphical representation. Some or all of the graphical representations may comport with the graphical representations of FIG. 1B. Once the characteristics of a bubble-out target display are known, then aspects of the transition can be determined and step 252, step 254, and step 256 are carried out.

The performance of step 252, step 254, and step 256 is facilitated by mapping module 246₂, a set of transition rules 257, and a transition rendering engine 269. In this embodiment, the set of transition rules 257 and the transition rendering engine 269 are informed by a set of radial rotation rules 260, a set of expansion/explosion rules 261, and a set of collapse/implosion rules 263. Strictly as examples, the radial rotation rules 260 might define a speed and direction of rotation, the set of expansion/explosion rules 261 might define an order and rate of expansion/explosion, and the set of implosion rules 263 might define an order and rate of implosion.

Once the transition to the target state graphical depiction has been accomplished, rendering system 2C00 waits for further user input (step 262) such as selection event 268. The semantics of such a selection event might be configurable. Strictly as examples, a click on any entity of a hierarchy might initiate rotation or, alternatively, a click on a lower-level entity of a hierarchy might initiate a further expansion/explosion of the clicked-on node, etc.

Referring again to step 242, to maintain underlying data (e.g., data pertaining to a data center or pertaining to a cluster or pertaining to a node or pertaining to a virtual machine or pertaining to a running process, etc.), some mechanism is needed to accomplish ongoing monitoring. One possible mechanism is shown and discussed as pertains to FIG. 2D.

Figure 2D:
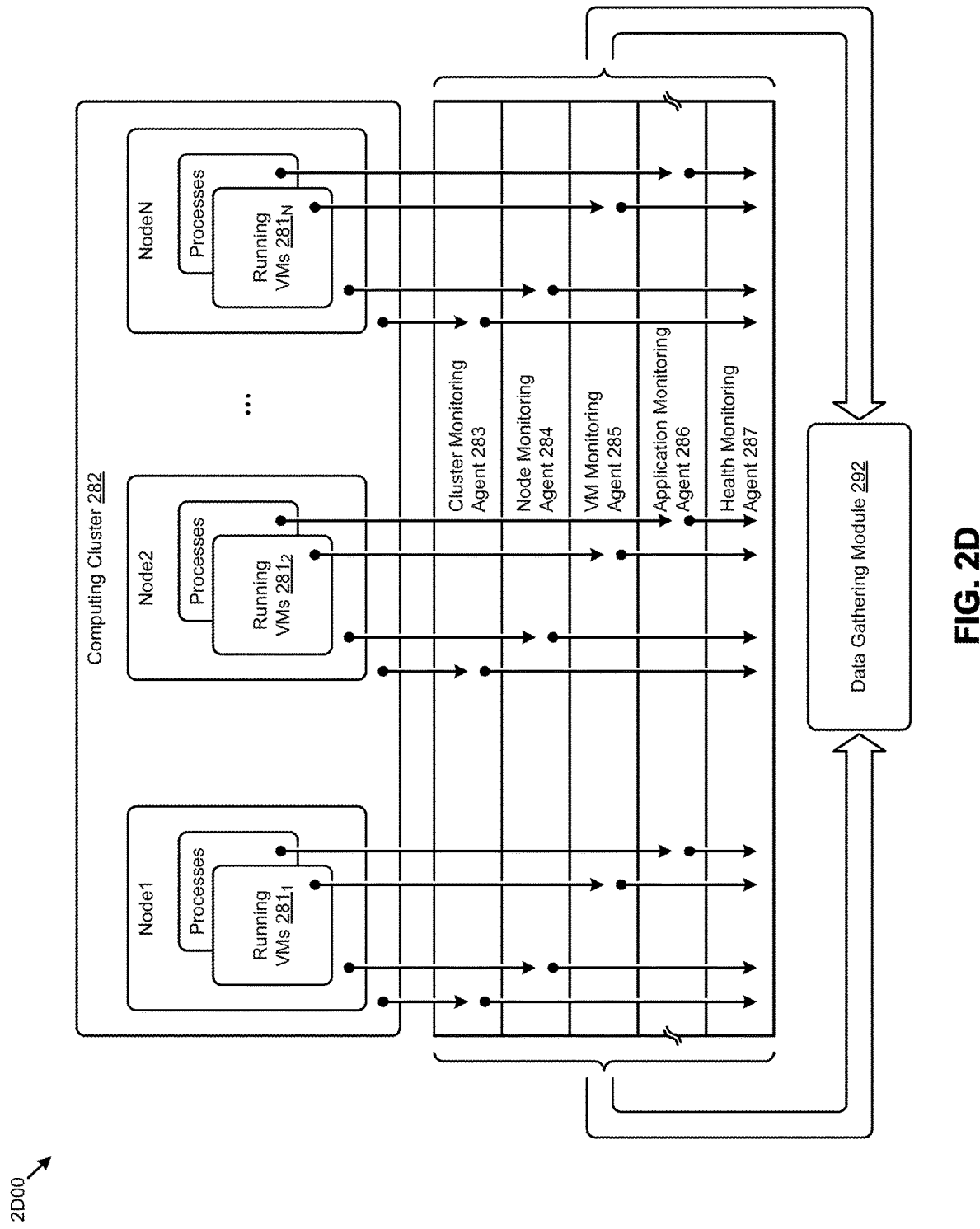
FIG. 2D depicts a cluster monitoring mechanism as used in systems that manage radial representation state changes in a computer-implemented user interface, according to an embodiment.

FIG. 2D depicts a cluster monitoring mechanism 2D00 as used in systems that manage state changes in a computer-implemented user interface.

The shown embodiment depicts a computing cluster 282, which computing cluster hosts a plurality of computing nodes (e.g., computing node1, computing node2, . . . , computing nodeN). Each computing node in turn hosts any number of virtual machines (e.g., running VMs $281_1$, running VMs $281_2$, . . . , running VMs $281_N$) and any number of processes (e.g., processes that are combined to form applications, processes that correspond to database application instances, etc.).

Monitoring agents (e.g., cluster monitoring agent 283, node monitoring agent 284, VM monitoring agent 285, application monitoring agent 286, health monitoring agent 287) can all operate concurrently and cooperatively. In the context of the present disclosure, the monitoring agents can be configured to provide ongoing state, performance, and problem/alert data to the shown data gathering module 292.

The shown agents are purely examples for illustration, and other agents that gather data from other operational elements of a data center are possible. The data gathering module may collect and hold monitoring data, or it may communicate monitoring data to a recipient. In the illustrative embodiments disclosed herein, the data gathering module 292 informs step 242 of FIG. 2C.

Figure 2E:
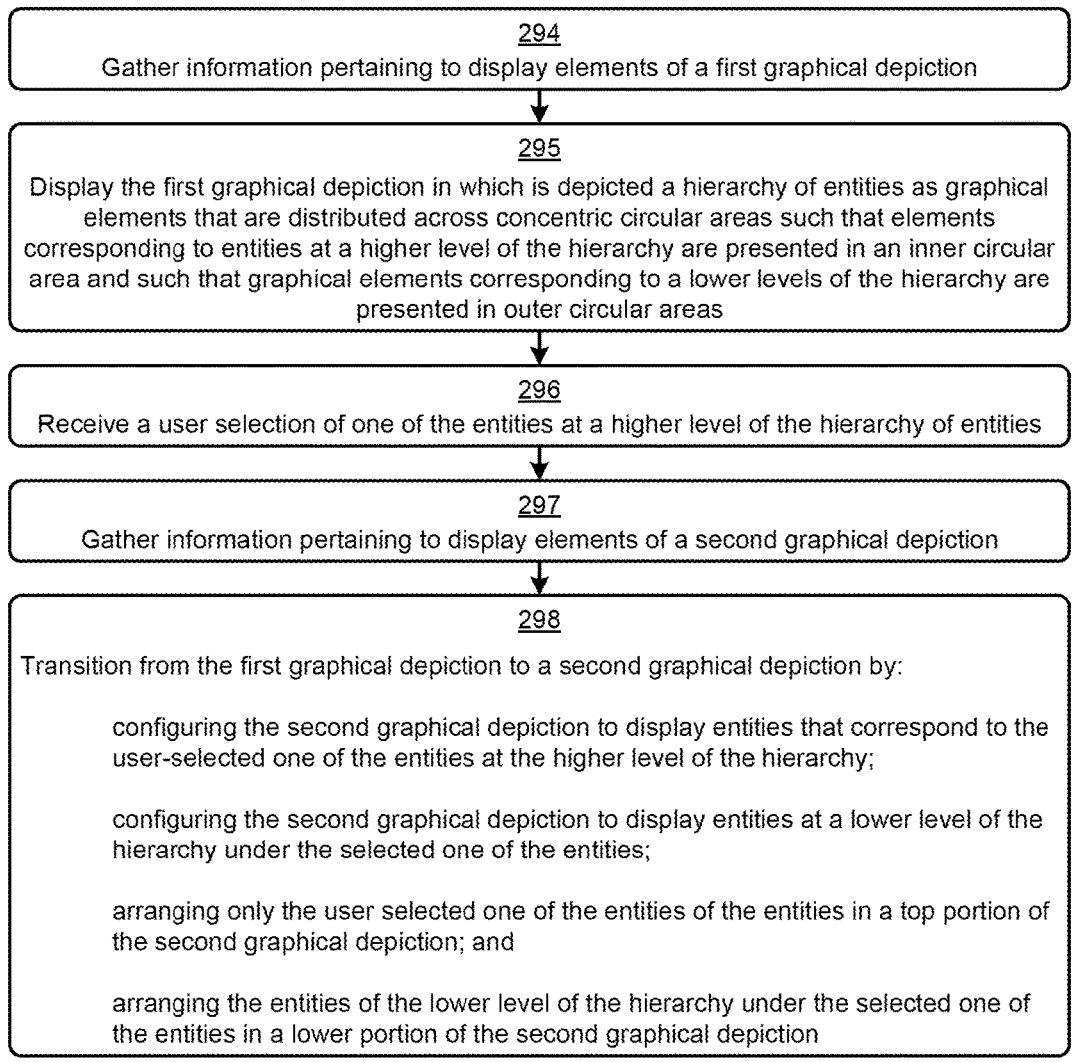
FIG. 2E presents a graphical user interface transitioning technique as used in systems that manage radial representation state changes in a computer-implemented user interface, according to an embodiment.

FIG. 2E presents a graphical user interface transitioning technique 2E00 as used in systems that manage state changes in a computer-implemented user interface.

Initially, step 294 is carried out to gather information pertaining to display elements of a first graphical depiction 101. When sufficient data is available, then, at step 295, a host node displays the first graphical depiction in which is depicted a hierarchy of entities as graphical elements that are distributed across concentric circular areas such that elements corresponding to entities at a higher level of the hierarchy are presented in an inner circular area and such that graphical elements corresponding to a lower levels of the hierarchy are presented in outer circular areas. A user indicates a user selection of one of the entities at a higher level of the hierarchy of the first graphical depiction.

At step 296, the user indication is received. Responsive to receipt of the user indication, further steps are taken (step 297) to initiate computer-aided gathering of information pertaining to display elements of a second graphical depiction 102. When such sufficient information is available, step 298 begins transitioning from the first graphical depiction to a second graphical depiction by configuring positioning of graphical elements into the second graphical depiction 102 such that, when the transition is complete, the second graphical depiction displays entities that correspond to the user-selected one of the entities at the higher level of the hierarchy. The transition may include further configuring the second graphical depiction to display entities at a lower level of the hierarchy under the selected one of the entities.

The foregoing disclosure supports many variations of many methods. Strictly as an example, one alternative method for transitioning from a first graphical depiction to a second graphical depiction comprises steps of: (1) presenting a first graphical depiction that depicts a hierarchy of entities as graphical elements that are distributed across concentric circular areas such that graphical elements corresponding to entities at a higher level of the hierarchy are presented in an inner circular area and such that graphical elements corresponding to a lower levels of the hierarchy are presented in outer circular areas of the first graphical depiction; (2) receiving a user selection of a graphical element of the first graphical depiction; and (3) transitioning from the first graphical depiction to the second graphical depiction such that only one of the entities at a higher level of the hierarchy and its corresponding graphical elements corresponding to the lower levels of the hierarchy are displayed in the second graphical depiction.

As another example, an alternative method for transitioning between two graphical user interfaces comprises: (1) gathering information pertaining to display elements of a circular first graphical depiction; (2) displaying the circular first graphical depiction that depicts a hierarchy of entities as graphical elements that are distributed across concentric circular areas such that elements corresponding to entities at a higher level of the hierarchy are presented in an inner circular area and such that graphical elements corresponding to a lower levels of the hierarchy are presented in outer circular areas; (3) receiving a user selection of one of the entities at a higher level of the hierarchy of the circular first graphical depiction; (4) gathering information pertaining to display elements of a second graphical depiction; and (5) transitioning from the first graphical depiction interface to a second graphical depiction by: (a) configuring the second graphical depiction 102 to display entities that correspond to the user selected one of the entities at the higher level of the hierarchy and configuring the second graphical depiction to display entities at a lower level of the hierarchy below the selected one of the entities; (b) arranging only the user selected one of the entities of the entities into a top portion of the second graphical depiction; and (c) arranging the entities of the lower level of the hierarchy under the selected one of the entities into a lower portion of the second graphical depiction.

As yet another example, a further alternative method for transitioning between two graphical user interfaces comprises: (1) accessing data comprising two or more entities that are hierarchically related to each other; (2) populating a first data structure that underlies a first graphical depiction that is configured to present higher level entity of the two or more entities; (3) populating a second data that underlies a second graphical depiction that is configured to present a lower level entity of the two or more entities; (4) presenting the first graphical depiction in a radial representation having the higher level entity in a first circular area of the radial representation and the lower level entity in a second circular area of the representation; (5) receiving a user indication of a selected entity of the first graphical depiction; and (6) transitioning from the first graphical depiction to a second graphical depiction, wherein the second graphical depiction comprises an expanded representation of the selected entity into the second circular area, the expanded representation comprises representations of constituents of the selected entity and wherein the second graphical depiction comprises a collapsed representation of a non-selected entity into the second circular area.

Figure 3A:
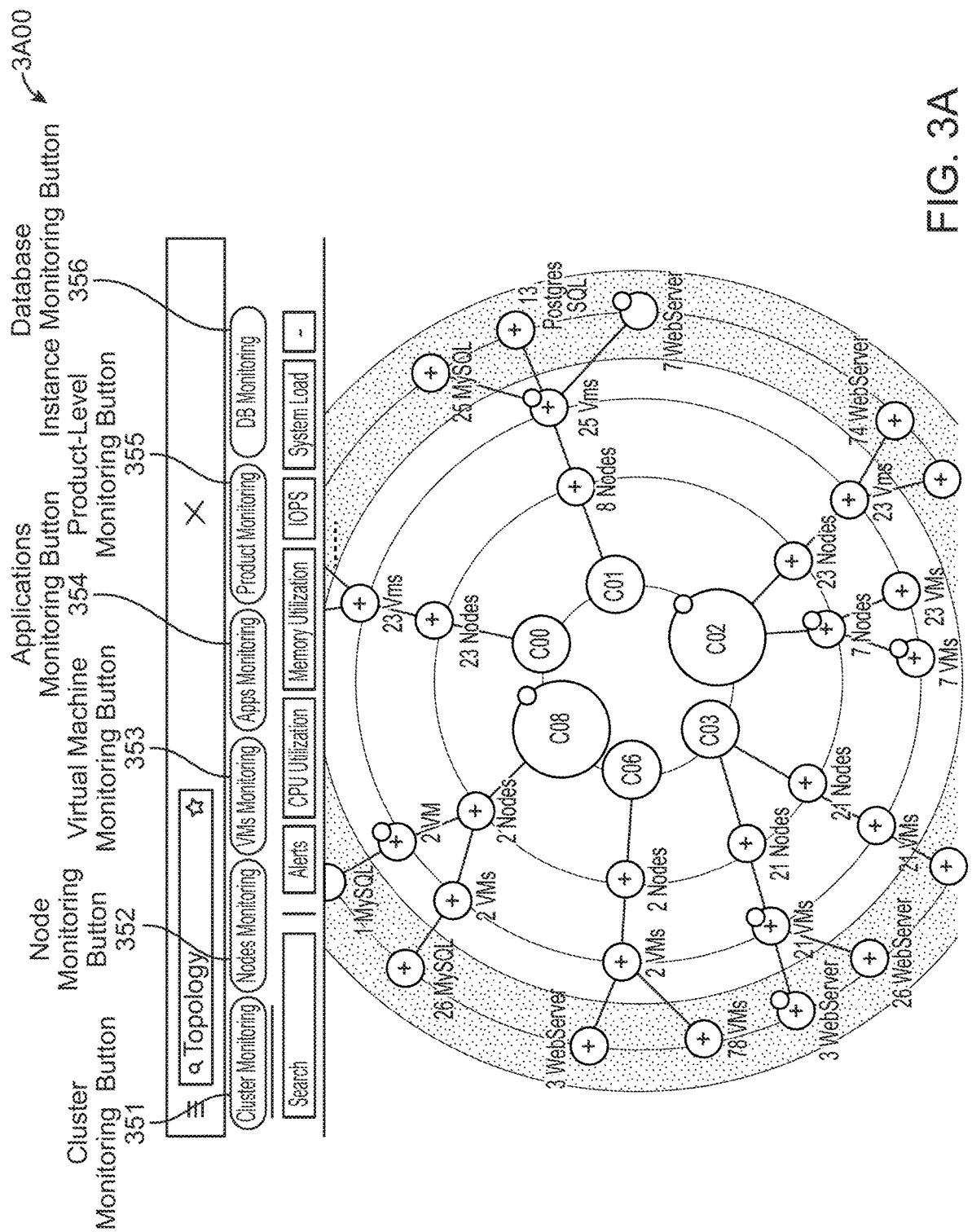
FIG. 3A depicts an example initial state representation as used in a computer-implemented user interface, according to an embodiment.

FIG. 3A depicts an example initial state representation 3A00 of a computer-implemented user interface. As an option, one or more variations of initial state representation 3A00 or any aspect thereof may be implemented in the context of the architecture and functionality of the embodiments described herein. The initial state representation 3A00 or any aspect thereof may be implemented in any environment.

In the particular example of FIG. 3A, the environment is one of a computing cluster. Moreover, this particular initial state representation 3A00 includes a banner that offers choices for the initial bubble-out of an initial state representation. In this environment, the choices include cluster monitoring, node monitoring, virtual machine monitoring, applications monitoring, product-level monitoring, and/or database monitoring.

In the shown example, such a user interface interaction can be made by clicking on a button that correspond to the choice. As can be seen, the banner area in the shown initial state representation 3A00 includes a cluster monitoring button 351, a node monitoring button 352, a virtual machine monitoring button 353, an applications monitoring button 354, a product-level monitoring button 355, and a database instance monitoring button 356.

A particular choice can be indicated by a user through a user interface interaction. Strictly as one example, a user might click on the cluster monitoring button 351 so as to initiate repainting of the representation of the system in a manner that highlights (e.g., via visually-discernable graphics) health conditions of the clusters. As another example, a user might click on the virtual machine monitoring button 353 so as to initiate continuous repainting of the representation of the system in a manner that highlights alerts or other health conditions of the virtual machines that are running in the underlying computing system. A count of alerts arising from virtual machines in a particular branch of the hierarchy may be summed and displayed as a number.

The banner also includes a search box as well as a set of pre-defined filters. The shown pre-defined filters include "Alerts", "CPU Utilization", "Memory Utilization", "IOPS", and "System Load". User selection of a filter can be made by clicking on text in the banner that correspond to the chosen pre-defined filter. The effect of selection of a particular filter includes annotation of then-current values onto any of the graphical representations of any of the entities that are showing in the initial state representation 3A00. As one example, when the "Alerts" filter is selected by the user, then alert decorations (e.g., to show alert cardinality) is applied to a corresponding entity's graphical representation. Any filter can be associated with a set of user preferences. Application of alert decorations to entities can be configured by a given user and/or his/her administrator. Strictly as one example, a user preference might be to apply alert decorations only to a highest level of the hierarchy. As another distinguishing example, a user preference might be to apply alert decorations across all levels of the hierarchy. As another distinguishing example, a user preference might be to apply alert decorations across all levels of the hierarchy and to roll-up the alert sum at a subject node of a particular level, where the roll-up alert sum is accumulated by traversing from the lowest level of the hierarchy below the subject node to the subject node of a particular level. In some cases alerts are automatically rolled-up and summed. In some cases alerts are automatically rolled-up and summed so as to determine a severity. When a severity value is greater than a threshold, an impact indication is displayed. In some cases alerts derive from virtual machine problems.

In some cases, the nature of various sets of then-current attribute values and/or the nature of various types of entity expansions admits of representation in one or more specialized graphics that are specific to the nature of the underlying data. For example, some sets of then-current values can be conveniently represented in an attribute summary sidebar. Or, for example, some sets of then-current attribute values can be conveniently represented in a time chart. Or, for example, some sets of entity expansions can be conveniently represented in a pop-up. An example attribute summary is given in FIG. 3B. An example attribute time chart is given in FIG. 3C. An example pop-up is given FIG. 3D.

FIG. 3B depicts an example of an attribute summary sidebar representation 3B00 as used in a computer-implemented user interface. As an option, one or more variations of attribute summary sidebar representation 3B00 or any aspect thereof may be implemented in the context of the architecture and functionality of the embodiments described herein. The attribute summary sidebar representation 3B00 or any aspect thereof may be implemented in any environment.

The shown side panel 340 presents data in summary fashion. The layout and contents of such a side panel can be tied to any particular entity. For example, a particular instance of a side panel can be tied to a data center, and any particular characteristic or group of characteristics or series of values (e.g., attribute values, parameter values, etc.) can be displayed in a table and/or in a chart.

In some cases, a chart that includes a time variable facilitates high-cognition. In such cases, a time chart may be presented in a sidebar or in addition to a sidebar. The data in the sidebar can be tied to any timewise variation of any attribute value or values over any monitored entity.

FIG. 3C depicts an example of an attribute time chart sidebar representation 3C00 as used zin a computer-implemented user interface. As an option, one or more variations of attribute time chart sidebar representation 3C00 or any aspect thereof may be implemented in the context of the architecture and functionality of the embodiments described herein. The attribute time chart sidebar representation 3C00 or any aspect thereof may be implemented in any environment.

As shown, the CPU utilization time chart 342 is a line chart representation of CPU utilization over time. Additionally or alternatively, a memory utilization time chart 343 might be presented as a line chart representation of memory utilization over time. In some case, the timewise variation of CPU utilization value is averaged across quantized sampling periods (e.g., by hour, or by minute, etc.).

Figure 3D:
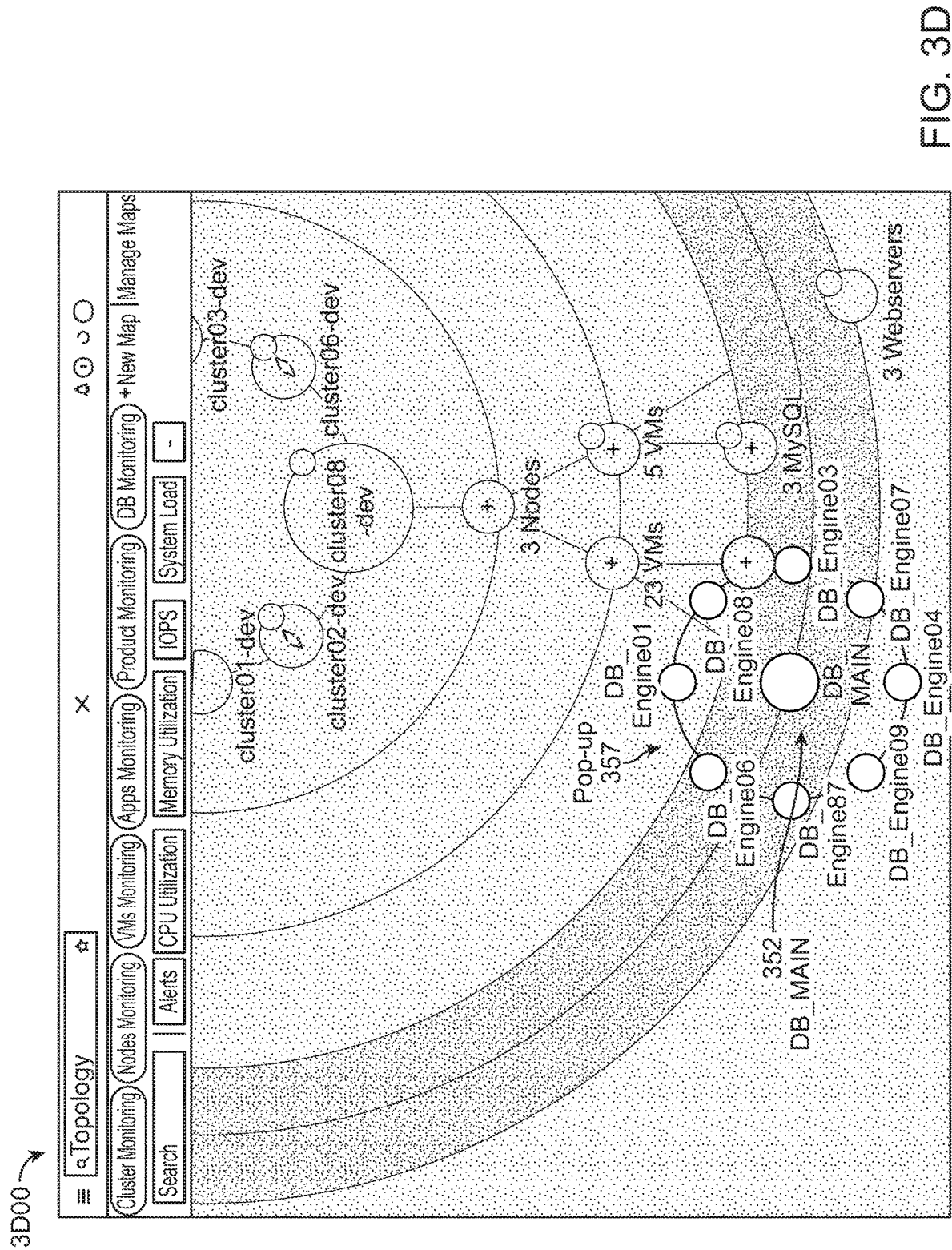
FIG. 3D depicts a pop-up representation as used in a computer-implemented user interface, according to an embodiment.

FIG. 3D depicts a pop-up representation 3D00 as used in a computer-implemented user interface. As an option, one or more variations of pop-up representation 3D00 or any aspect thereof may be implemented in the context of the architecture and functionality of the embodiments described herein. The pop-up representation 3D00 or any aspect thereof may be implemented in any environment and/or for facilitating any use case.

Strictly as one example use case, a display of a pop-up is initiated in response to a user indication (e.g., hover, touch, click, etc.) to expand on a particular selected grouped entity. For example, if the user interface is showing a grouped entity (represented as a circle with a '+' sign inside the circle), and of that grouped entity is composed of 5 database application servers, then a user interaction with or over that grouped entity would create a pop-up showing the 5 individual database application servers.

In the example of FIG. 3D, pop-up 357 appears upon a first user indication (e.g., a pop-up request event), and disappears upon a second user indication (e.g., a pop-up cancel event). For example, if a user hovers over DB_MAIN 352 (e.g., for 1 second or more), pop-up 357 appears responsive to that hovering interaction, and disappears when the user is no longer hovering on DB_MAIN 352. As another example, if a user down-clicks over DB_MAIN 352, then pop-up 357 appears and remains showing until an up-click event. In some cases, the constituents of the pop-up are highlighted to provide visual contrast from the non-pop-up portion of the display. In some cases, and as shown, the non-pop-up portion of the display is darkened so as to provide visual contrast from the constituents of the pop-up. A pop-up can be defined to correspond to any particular type of graphical representation.

Figure 4:
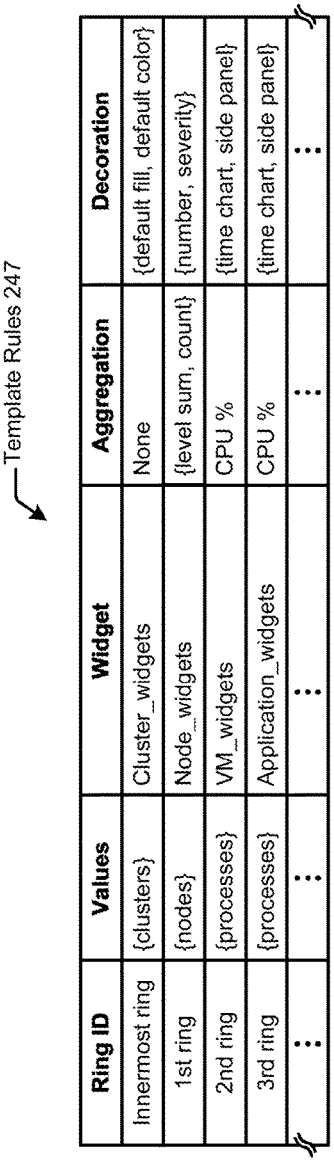
FIG. 4 depicts an example template rule codification technique as used in systems that implement radial user interfaces, according to an embodiment.

FIG. 4 depicts an example template rule codification technique 400 as used in systems that implement computer-implemented radial user interfaces. As an option, one or more variations of template rule codification technique 400 or any aspect thereof may be implemented in the context of the architecture and functionality of the embodiments described herein. The template rule codification technique 400 or any aspect thereof may be implemented in any environment.

As previously discussed with respect to step 248 of FIG. 2C, an initial bubble-out can be facilitated through use of UI templates in combination with template rules 247. FIG. 4 depicts one possible way to capture rules that can be applied during bubble-out. This embodiment is particular to an implementation where the concentric concave areas are configured as concentric rings or bands. The template rules 247 depicts different rules for different rings. Specifically, according to this tabularized codification of this particular set of template rules, the innermost ring is populated cluster widgets, which are in turn filled using the default fill and colored using the default color. Also, according to this particular set of template rules the first ring outward is populated with node_widgets and any values that attach, such as a level sum or other type of count is displayed as an aggregation, the second ring outward is populated with VM_widgets and any values that attach, such as a level sum or other type of count is displayed as an aggregation, and the third ring outward is populated with application_widgets and any values that attach, and so on such that a value or values in a cell in the table informs what values (e.g., via the "Values" column) or how (e.g., via the "Widget" and/or "Aggregation", and/or "Decoration") the entries apply to a particular aspect of the bubble-out.

The foregoing template rules can be applied to any presentation (e.g., a first graphical depiction, a second graphical depiction, a pop-up, a layout, a side panel, a time chart etc.). Additionally, for making a transition from one presentation or state to another presentation or state (e.g., from a first graphical depiction to a second graphical depiction), a set of state transition rules can be applied. Example state transition rules and a technique for applying such transition rules are now briefly discussed.

Figure 5:
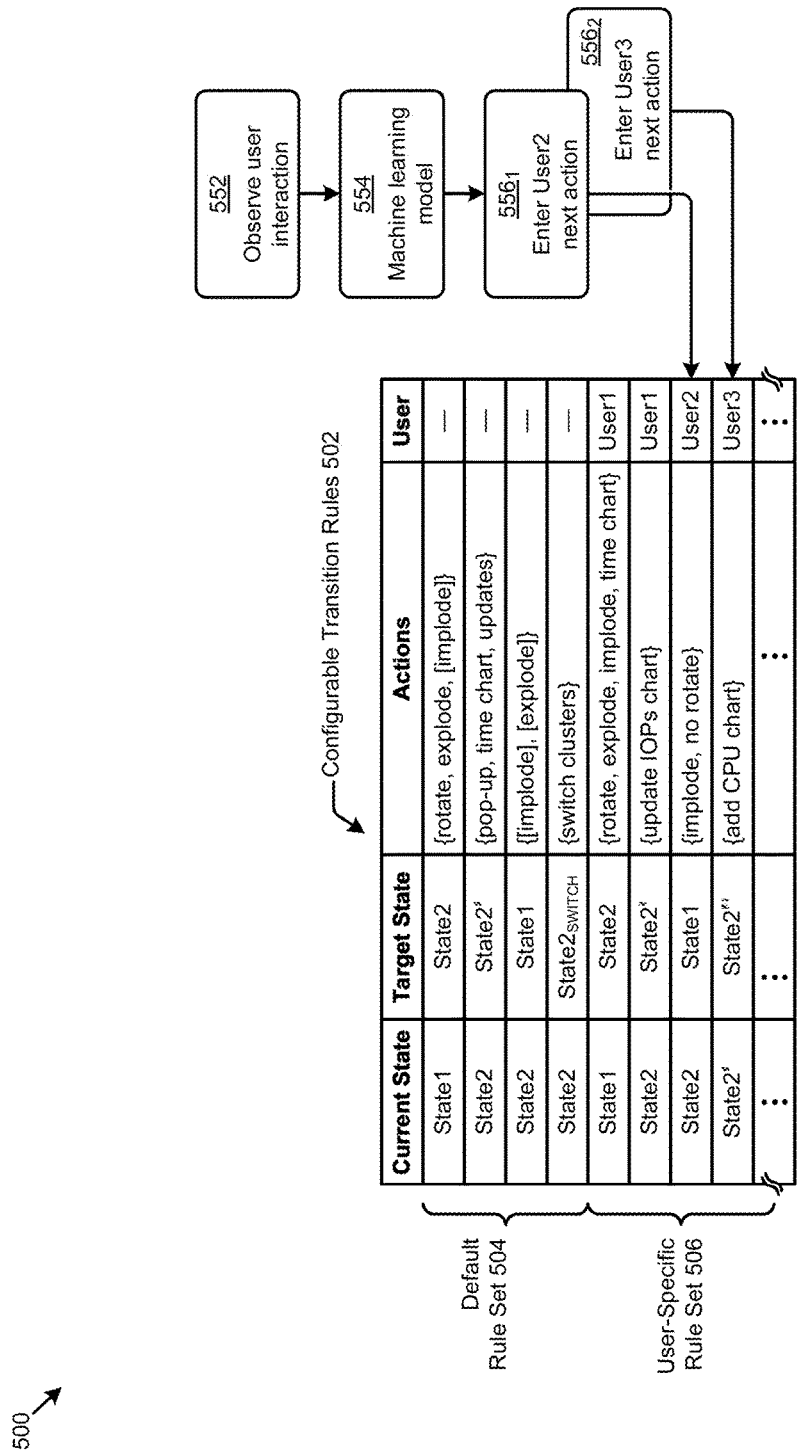
FIG. 5 depicts state transition rule application techniques as used in systems that implement radial user interfaces, according to an embodiment.

FIG. 5 depicts state transition rule application techniques 500 as used in systems that implement computer-implemented radial user interfaces. As an option, one or more variations of state transition rule codification technique 500 or any aspect thereof may be implemented in the context of the architecture and functionality of the embodiments described herein. The state transition rule codification technique 500 or any aspect thereof may be implemented in any environment.

As shown, the transition rules 502 are codified in accordance with a syntax that serves to capture a sequence of actions to be applied under particular circumstances. For example, when the conditions are present such that the then-current state of the display is "State1" and when it is known that the next state is "State2", then, according to the corresponding rule, the actions to apply include "rotate", "explode" and "implode". This is shown in the top row of the default rule set 504. Of course the default set may be defined differently from that as shown in FIG. 5.

As merely one more example, a transition rule can be defined to transition from first display of a first cluster in "State2" to a second display of a different cluster in "State2$_{SWITCH}$". In this example case, the user did not have to transition back to "State1" in order to see a display of a different cluster. This aids user cognition.

Characteristics of any particular action may be further defined, either in additional rules, and/or in additional columns of a table, and/or in code, etc. In fact, a first default set can define user actions and corresponding responses that are configured differently from a second default set of user actions and corresponding responses. In some cases multiple configurations are configurable as an either/or option, or as a choice of one option. In some cases, multiple configurations can be operational in the same session. Some examples are shown in Table 1.

TABLE 1

Example user interaction configuration options

| User Interaction | Configuration Option #1 | Configuration Option #2 |
|---|---|---|
| Click on an entity in the center area | Invoke gun-barrel rotation | Until click-up event, display a pop-up |
| Click on an entity in a ring | Impute semantics of clicking on an entity in the center area and invoke gun-barrel rotation | Until click-up event, display a pop-up |
| Indicate a non-selected cluster | The previous cluster's entities are collapsed and the indicated cluster's entities are expanded into view until another cluster is selected | Responsive to a hovering indication over an indicated cluster, the previous cluster's entities are temporarily collapsed and the hovered-over cluster's entities are expanded into view during the hovering |

Still further, configurable transition rules 502 can include rules that are user-specific. The user specific rule set 506 can be static such that the table entries are made based on a user-specific data structure (e.g., a profile) or, the user specific rules can be updated dynamically such that the table entries are made based on a user-specific actions. Moreover, a learning system can be deployed so as to observe sequences of user-specific actions, and when the learning system determines that certain sequences of user-specific actions for a particular user are repeating, then the learning system can make an entry or entries into the user specific rules. In such cases, the entry or entries made by the learning system are associated with an indication of the particular user whose sequences had been observed. To accomplish this, an observation module 552 is configured to be able to observe user interactions, and such observations are provided on an ongoing basis to a machine learning model 554. After a sufficiently long observation period, the learning model can predict, to a calculable statistical degree of certainty that particular user will move from a particular then-current state to a next state. When a then-current statistical degree of certainty exceeds some threshold for that particular user, then steps are taken (e.g., step $556_1$ and/or step $556_2$) to make entries into the user-specific set of transition rules.

Any of the foregoing embodiments can be implemented in the context of a virtualized computing system. In some cases, the computing entities and/or their operation are facilitated by a virtualized controller. Examples of such a virtualized controller and its role in a virtualized computing system are shown and discussed as pertains to FIG. 6A, FIG. 6B, FIG. 6C and FIG. 6D.

System Architecture Overview

Additional System Architecture Examples

Figure 6A:
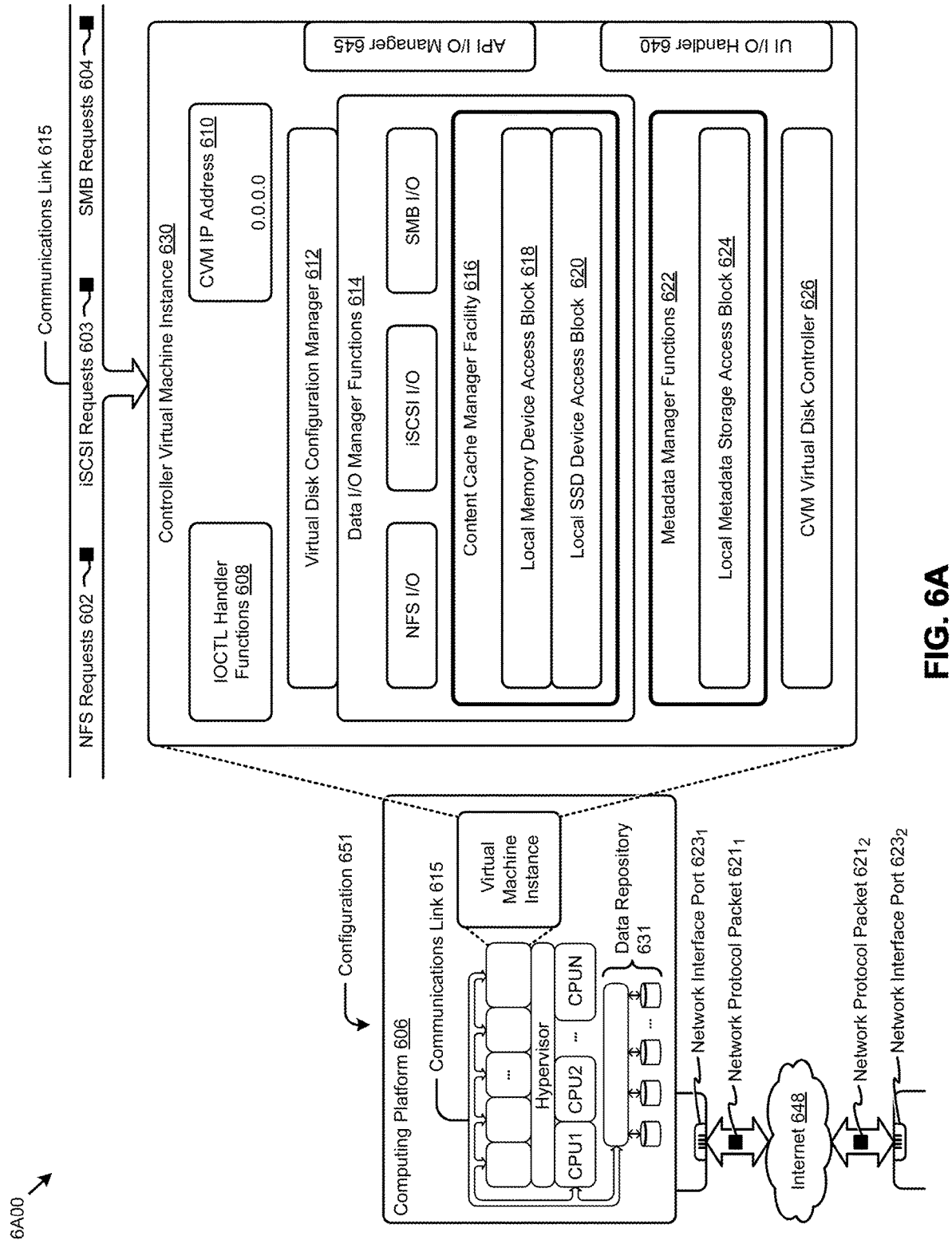
FIG. 6A, FIG. 6B, FIG. 6C, and FIG. 6D depict virtualization system architectures comprising collections of interconnected components suitable for implementing embodiments of the present disclosure and/or for use in the herein-described environments.

FIG. 6A depicts a virtualized controller as implemented in the shown virtual machine architecture 6A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 6A00 comprises a collection of interconnected components suitable for implementing embodiments of the present disclosure and/or for use in the herein-described environments. Moreover, virtual machine architecture 6A00 includes a virtual machine instance in configuration 651 that is further described as pertaining to controller virtual machine instance 630. Configuration 651 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 630.

In this and other configurations, a controller virtual machine instance receives block I/O storage requests as network file system (NFS) requests in the form of NFS requests 602, and/or internet small computer storage interface (iSCSI) block IO requests in the form of iSCSI requests 603, and/or Samba file system (SMB) requests in the form of SMB requests 604. The controller virtual machine (CVM) instance publishes and responds to an internet protocol (IP) address (e.g., CVM IP address 610). Various forms of input and output can be handled by one or more IO control handler functions (e.g., IOCTL handler functions 608) that interface to other functions such as data IO manager functions 614 and/or metadata manager functions 622. As shown, the data IO manager functions can include communication with virtual disk configuration manager 612 and/or can include direct or indirect communication with any of various block IO functions (e.g., NFS IO, iSCSI IO, SMB IO, etc.).

In addition to block IO functions, configuration 651 supports IO of any form (e.g., block IO, streaming IO, packet-based IO, HTTP traffic, etc.) through either or both of a user interface (UI) handler such as UI IO handler 640 and/or through any of a range of application programming interfaces (APIs), possibly through API IO manager 645.

Communications link 615 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 630 includes content cache manager facility 616 that accesses storage locations, possibly including local dynamic random access memory (DRAM) (e.g., through local memory device access block 618) and/or possibly including accesses to local solid state storage (e.g., through local SSD device access block 620).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 631, which in turn can be formatted into any one or more storage areas, and which can comprise parameterized storage accessible by a key (e.g., a filename, a table name, a block address, an offset address, etc.). Data repository 631 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 624. The data repository 631 can be configured using CVM virtual disk controller 626, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 651 can be coupled by communications link 615 (e.g., backplane, LAN, PSTN, wired or wireless network, etc.) and each instance may perform respective portions of sequences of instructions as may be required to practice embodiments of the disclosure.

The shown computing platform 606 is interconnected to the Internet 648 through one or more network interface ports (e.g., network interface port $623_1$ and network interface port $623_2$). Configuration 651 can be addressed through one or more network interface ports using an IP address. Any operational element within computing platform 606 can perform sending and receiving operations using any of a range of network protocols, possibly including network protocols that send and receive packets (e.g., network protocol packet $621_1$ and network protocol packet $621_2$).

Computing platform 606 may transmit and receive messages that can be composed of configuration data and/or any other forms of data and/or instructions organized into a data structure (e.g., communications packets). In some cases, the data structure includes program instructions (e.g., application code) communicated through the Internet 648 and/or through any one or more instances of communications link 615. Received program instructions may be processed and/or executed by a CPU as it is received and/or program instructions may be stored in any volatile or non-volatile storage for later execution. Program instructions can be transmitted via an upload (e.g., an upload from an access device over the Internet 648 to computing platform 606). Further, program instructions and/or the results of executing program instructions can be delivered to a particular user via a download (e.g., a download from computing platform 606 over the Internet 648 to an access device).

Configuration 651 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to radial user interfaces. In some embodiments, a module may include one or more state machines and/or combinational logic used to implement or facilitate the operational and/or performance characteristics pertaining to presenting state changes in radial representation user interfaces.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of radial representation user interface state changes). Such files or records can be brought into and/or stored in volatile or non-volatile memory. More specifically, the occurrence and organization of the foregoing files, records, and data structures improve the way that the computer stores and retrieves data in memory, for example, to improve the way data is accessed or manipulated when the computer is performing operations pertaining to user interface state changes.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 6B:
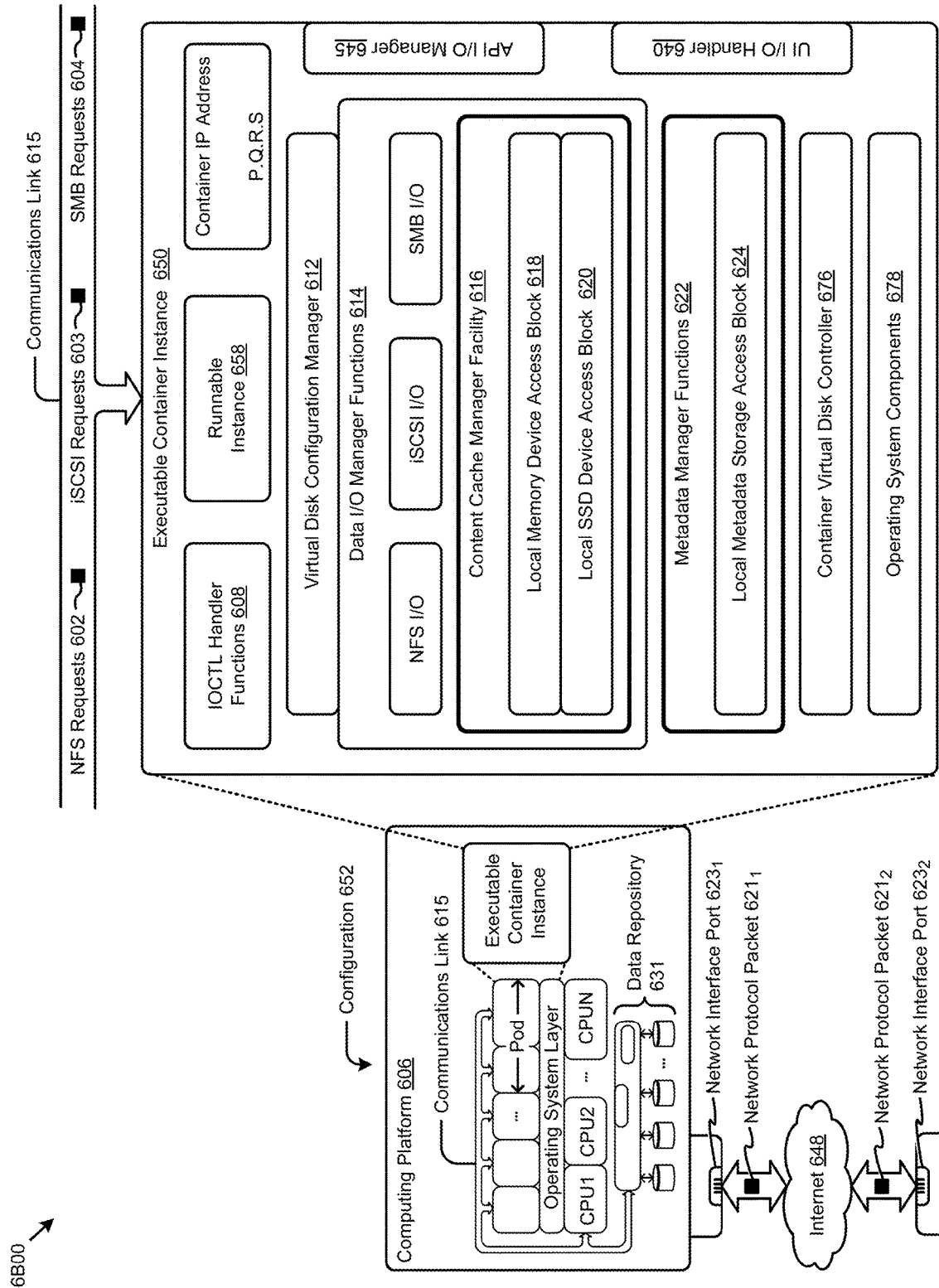

FIG. 6B depicts a virtualized controller implemented by containerized architecture 6B00. The containerized architecture comprises a collection of interconnected components suitable for implementing embodiments of the present disclosure and/or for use in the herein-described environments. Moreover, the shown containerized architecture 6B00 includes an executable container instance in configuration 652 that is further described as pertaining to executable container instance 650. Configuration 652 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 650). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls -a", etc.). The executable container might optionally include operating system components 678, however such a separate set of operating system components need not be provided. As an alternative, an executable container can include runnable instance 658, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 676. Such a container virtual disk controller can perform any of the functions that the aforementioned CVM virtual disk controller 626 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 6C:
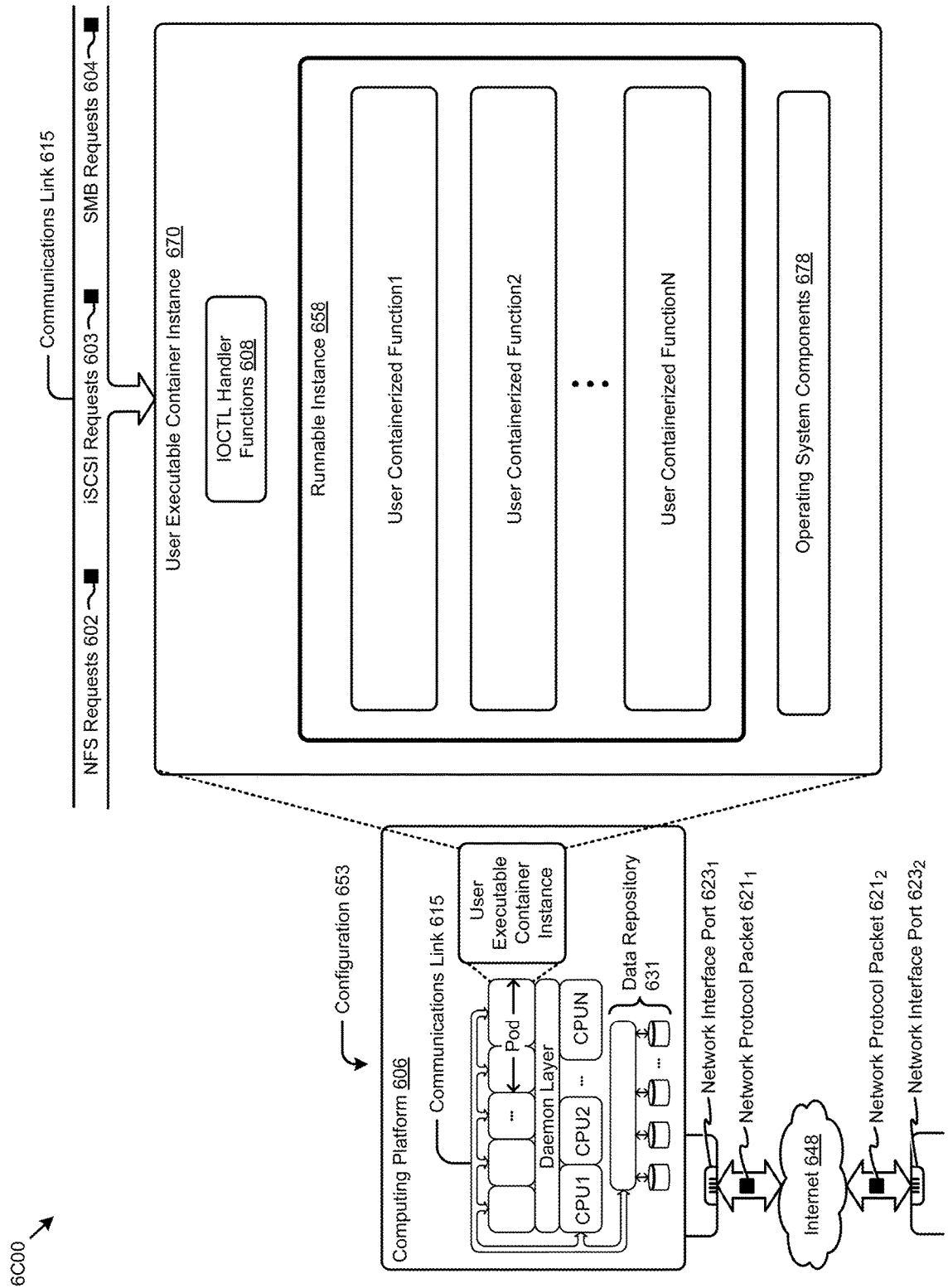

FIG. 6C depicts a virtualized controller implemented by a daemon-assisted containerized architecture 6C00. The containerized architecture comprises a collection of interconnected components suitable for implementing embodiments of the present disclosure and/or for use in the herein-described environments. Moreover, the shown daemon-assisted containerized architecture includes a user executable container instance in configuration 653 that is further described as pertaining to user executable container instance 670. Configuration 653 includes a daemon layer (as shown) that performs certain functions of an operating system.

User executable container instance 670 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 658). In some cases, the shown operating system components 678 comprise portions of an operating system, which portions are interfaced with or included in the runnable instance and/or any user containerized functions. In this embodiment of a daemon-assisted containerized architecture, the computing platform 606 might or might not host operating system components other than operating system components 678. More specifically, the shown daemon might or might not host operating system components other than operating system components 678 of user executable container instance 670.

The virtual machine architecture 6A00 of FIG. 6A and/or the containerized architecture 6B00 of FIG. 6B and/or the daemon-assisted containerized architecture 6C00 of FIG. 6C can be used in any combination to implement a distributed platform that contains multiple servers and/or nodes that manage multiple tiers of storage where the tiers of storage might be formed using the shown data repository 631 and/or any forms of network accessible storage. As such, the multiple tiers of storage may include storage that is accessible over communications link 615. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 651 of FIG. 6A) to manage the interactions between the underlying hardware and user virtual machines or containers that run client software.

Distinct from user virtual machines or user executable containers, a special controller virtual machine (e.g., as depicted by controller virtual machine instance 630) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 6D:
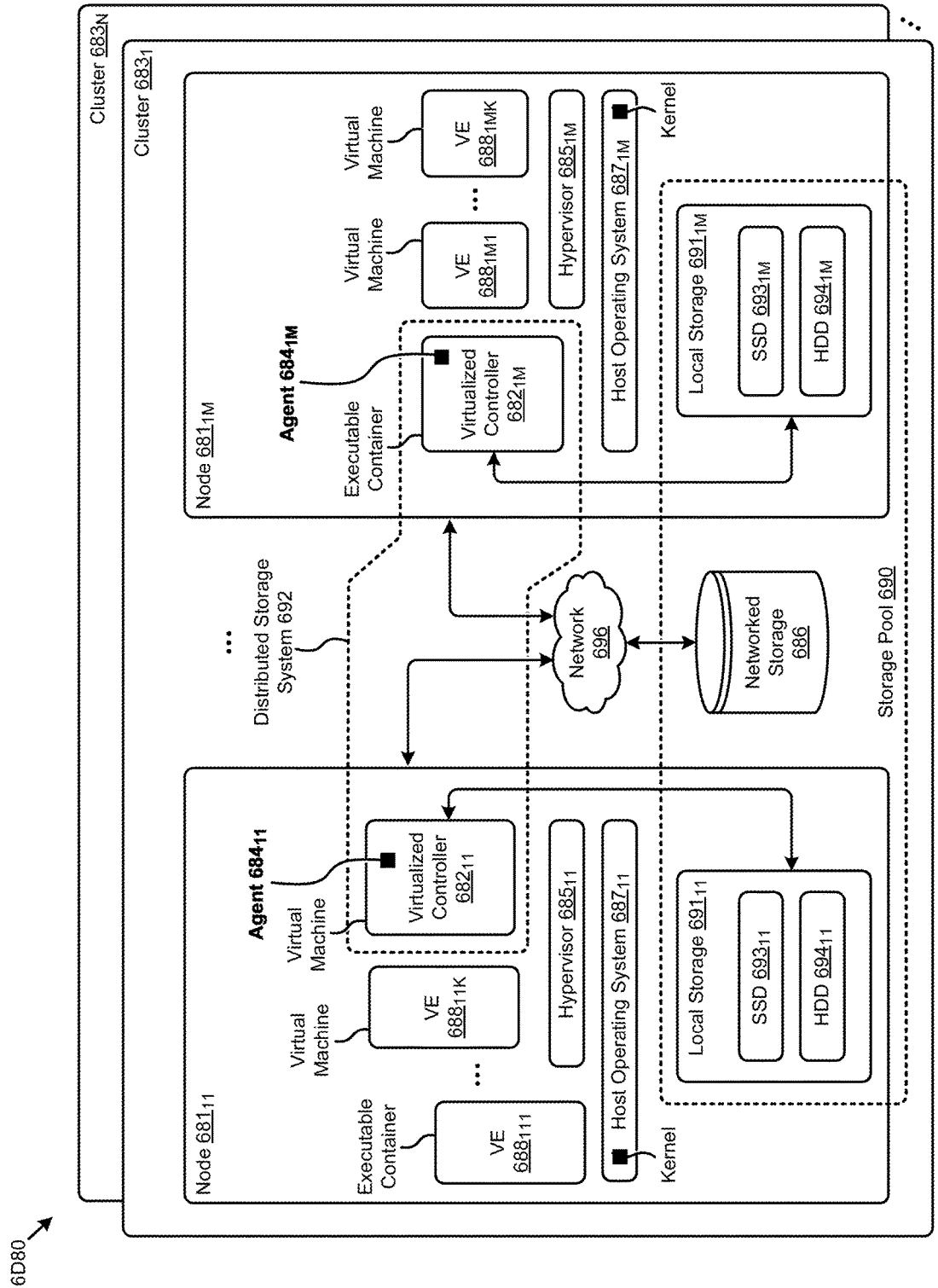

FIG. 6D depicts a distributed virtualization system in a multi-cluster environment 6D80. The shown distributed virtualization system is configured to be used to implement the herein disclosed techniques. Specifically, the distributed virtualization system of FIG. 6D comprises multiple clusters (e.g., cluster $683_1$, . . . , cluster $683_N$) comprising multiple nodes that have multiple tiers of storage in a storage pool. Representative nodes (e.g., node $681_{11}$, . . . , node $681_{1M}$) and storage pool 690 associated with cluster $683_1$ are shown. Each node can be associated with one server, multiple servers, or portions of a server. The nodes can be associated (e.g., logically and/or physically) with the clusters. As shown, the multiple tiers of storage include storage that is accessible through a network 696, such as a networked storage 686 (e.g., a storage area network or SAN, network attached storage or NAS, etc.). The multiple tiers of storage further include instances of local storage (e.g., local storage $691_{11}$, . . . , local storage $691_{1M}$). For example, the local storage can be within or directly attached to a server and/or appliance associated with the nodes. Such local storage can include solid state drives (SSD $693_{11}$, ..., SSD $693_{1M}$), hard disk drives (HDD $694_{11}$, ..., HDD $694_{1M}$), and/or other storage devices.

As shown, any of the nodes of the distributed virtualization system can implement one or more user virtualized entities (e.g., VE $688_{111}$, ..., VE $688_{11K}$, ..., VE $688_{1M1}$, ..., VE $688_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $687_{11}$, ..., host operating system $687_{1M}$), while the VMs run multiple applications on various respective guest operating systems. Such flexibility can be facilitated at least in part by a hypervisor (e.g., hypervisor $685_{11}$, ..., hypervisor $685_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers comprise groups of processes and/or resources (e.g., memory, CPU, disk, etc.) that are isolated from the node host computer and other containers. Such executable containers directly interface with the kernel of the host operating system (e.g., host operating system $687_{11}$, ..., host operating system $687_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 690 by the VMs and/or the executable containers.

Multiple instances of such virtualized controllers can coordinate within a cluster to form the distributed storage system 692 which can, among other operations, manage the storage pool 690. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $681_{11}$ can interface with a controller virtual machine (e.g., virtualized controller $682_{11}$) through hypervisor $685_{11}$ to access data of storage pool 690. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 692. For example, a hypervisor at one node in the distributed storage system 692 might correspond to software from a first vendor, and a hypervisor at another node in the distributed storage system 692 might correspond to a second software vendor. As another virtualized controller implementation example, executable containers can be used to implement a virtualized controller (e.g., virtualized controller $682_{1M}$) in an operating system virtualization environment at a given node. In this case, for example, the virtualized entities at node $681_{1M}$ can access the storage pool 690 by interfacing with a controller container (e.g., virtualized controller $682_{1M}$) through hypervisor $685_{1M}$ and/or the kernel of host operating system $687_{1M}$.

In certain embodiments, one or more instances of an agent can be implemented in the distributed storage system 692 to facilitate the herein disclosed techniques. Specifically, agent $684_{11}$ can be implemented in the virtualized controller $682_{11}$, and agent $684_{1M}$ can be implemented in the virtualized controller $682_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause the processor to perform a set of acts for transitioning from a first graphical depiction to a second graphical depiction, the set of acts comprising:

presenting, within a graphical user interface, a hierarchy of entities as graphical elements that are distributed across concentric circular or elliptical areas, wherein at least two of the graphical elements that correspond to sibling entities at a higher level of the hierarchy are presented in an inner circular or elliptical area and at least one additional graphical element that corresponds to a lower level of the hierarchy is presented in an outer circular or elliptical area but not in the inner circular or elliptical area;

receiving a selection of one sibling entity of the sibling entities at a higher level of the hierarchy presented in the inner circular or elliptical area; and rotating, by the graphical user interface, the graphical elements of the inner and outer circular or elliptical areas in response to receiving the selection of the one sibling entity, wherein the graphical elements that are distributed across the concentric circular or elliptical areas are rotated together to reposition the selected one sibling entity at the higher level of the hierarchy within the inner circular or elliptical area, and any unselected sibling entities remain visible and selectable.

2. The non-transitory computer readable medium of claim 1, wherein the graphical elements of the inner circular or elliptical area are rotated by presenting an animation comprising an ordered series of images that correspond to successive acts of rotation.

3. The non-transitory computer readable medium of claim 1, wherein an expansion of one of the sibling entities is initiated upon a user indication and the expanded one of the sibling entities is represented as a plurality of sub entities.

4. The non-transitory computer readable medium of claim 1, the set of acts further comprise responding to a user indication over a collapsed selectable sibling by initiating a display of a pop-up.

5. The non-transitory computer readable medium of claim 1, the set of acts further comprise fading or hiding a portion of the first graphical depiction after receiving the selection of the one sibling entity.

6. The non-transitory computer readable medium of claim 5, wherein the additional graphical element corresponds to an entity of a lower level of the hierarchy, and the additional graphical element comprises an impact indication when a corresponding severity value is greater than a threshold, and the impact indication comprises a numeric value of a cardinality of alerts present in entities that comprise lower levels of the hierarchy or corresponds to at least one of, an alert, a virtual machine problem, a database application alert, or a webserver alert.

7. The non-transitory computer readable medium of claim 1, wherein a second additional graphical element that corresponds to a second lower level of the hierarchy is presented in a second outer circular or elliptical area but not in the inner circular or elliptical area or the outer circular or elliptical area.

8. The non-transitory computer readable medium of claim 1, wherein at least one of the graphical elements corresponds to an entity that are represented with a graphical element border, a clickable expander, a count indication, an application label, a webserver label, or a virtual machine label.

9. A method for transitioning from a first graphical depiction to a second graphical depiction, the method comprising:
presenting, within a graphical user interface, a hierarchy of entities as graphical elements that are distributed across concentric circular or elliptical areas, wherein at least two of the graphical elements that correspond to sibling entities at a higher level of the hierarchy are presented in an inner circular or elliptical area and at least one additional graphical element that corresponds to a lower level of the hierarchy is presented in an outer circular or elliptical area but not in the inner circular or elliptical area;
receiving a selection of one sibling entity of the sibling entities at a higher level of the hierarchy presented in the inner circular or elliptical area; and
rotating, by the graphical user interface, the graphical elements of the inner and outer circular or elliptical areas in response to receiving the selection of the one sibling entity, wherein the graphical elements that are distributed across the concentric circular or elliptical areas are rotated together to reposition the selected one sibling entity at the higher level of the hierarchy within the inner circular or elliptical area, and any unselected sibling entities remain visible and selectable.

10. The method of claim 9, wherein the graphical elements of the inner circular or elliptical area are rotated by presenting an animation comprising an ordered series of images that correspond to successive acts of rotation.

11. The method of claim 9, wherein an expansion of one of the sibling entities is initiated upon a user indication and the expanded one of the sibling entities is represented as a plurality of sub entities.

12. The method of claim 9, further comprising responding to a user indication over a collapsed selectable sibling by initiating a display of a pop-up.

13. The method of claim 9, further comprising fading or hiding a portion of the first graphical depiction after receiving the selection of the one sibling entity.

14. The method of claim 13, wherein the additional graphical element corresponds to an entity of a lower level of the hierarchy, and the additional graphical element comprises an impact indication when a corresponding severity value is greater than a threshold, and the impact indication comprises a numeric value of a cardinality of alerts present in entities that comprise lower levels of the hierarchy or corresponds to at least one of, an alert, a virtual machine problem, a database application alert, or a webserver alert.

15. The method of claim 9, wherein a second additional graphical element that corresponds to a second lower level of the hierarchy is presented in a second outer circular or elliptical area but not in the inner circular or elliptical area or the outer circular or elliptical area.

16. The method of claim 9, wherein at least one of the graphical elements corresponds to an entity that are represented with a graphical element border, a clickable expander, a count indication, an application label, a webserver label, or a virtual machine label.

17. A system for transitioning from a first graphical depiction to a second graphical depiction, the system comprising:
a storage medium having stored thereon a sequence of instructions; and
a processor that executes the sequence of instructions to cause the processor to perform a set of acts comprising,
presenting, within a graphical user interface, a hierarchy of entities as graphical elements that are distributed across concentric circular or elliptical areas, wherein at least two of the graphical elements that correspond to sibling entities at a higher level of the hierarchy are presented in an inner circular or elliptical area and at least one additional graphical element that corresponds to a lower level of the hierarchy is presented in an outer circular or elliptical area but not in the inner circular or elliptical area;
receiving a selection of one sibling entity of the sibling entities at a higher level of the hierarchy presented in the inner circular or elliptical area; and
rotating, by the graphical user interface, the graphical elements of the inner and outer circular or elliptical areas in response to receiving the selection of the one sibling entity, wherein the graphical elements that are distributed across the concentric circular or elliptical areas are rotated together to reposition the selected one sibling entity at the higher level of the hierarchy within the inner circular or elliptical area, and any unselected sibling entities remain visible and selectable.

18. The system of claim 17, wherein the graphical elements of the inner circular or elliptical area are rotated by presenting an animation comprising an ordered series of images that correspond to successive acts of rotation.

19. The system of claim 17, wherein an expansion of one of the sibling entities is initiated upon a user indication and the expanded one of the sibling entities is represented as a plurality of sub entities.

20. The system of claim 17, the set of acts further comprise responding to a user indication over a collapsed selectable sibling by initiating a display of a pop-up.

21. The system of claim 17, the set of acts further comprise fading or hiding a portion of the first graphical depiction after receiving the selection of the one sibling entity.

22. The system of claim 21, wherein the additional graphical element corresponds to an entity of a lower level of the hierarchy, and the additional graphical element comprises an impact indication when a corresponding severity value is greater than a threshold, and the impact indication comprises a numeric value of a cardinality of alerts present in entities that comprise lower levels of the hierarchy or corresponds to at least one of, an alert, a virtual machine problem, a database application alert, or a webserver alert.

23. The system of claim 17, wherein a second additional graphical element that corresponds to a second lower level of the hierarchy is presented in a second outer circular or elliptical area but not in the inner circular or elliptical area or the outer circular or elliptical area.

24. The system of claim 17, wherein at least one of the graphical elements corresponds to an entity that are represented with a graphical element border, a clickable expander, a count indication, an application label, a webserver label, or a virtual machine label.

\* \* \* \* \*